United States Patent
Stephens et al.

(10) Patent No.: US 9,971,593 B2
(45) Date of Patent: *May 15, 2018

(54) INTERACTIVE CONTENT DEVELOPMENT

(71) Applicant: Sanctum Solutions, Inc., Houston, TX (US)

(72) Inventors: Noel Shepard Stephens, Spring, TX (US); Robert John Erwin, Houston, TX (US)

(73) Assignee: Sanctum Solutions, Inc., Houston, TX (US)

( * ) Notice: Subject to any disclaimer, the term of this patent is extended or adjusted under 35 U.S.C. 154(b) by 112 days.

This patent is subject to a terminal disclaimer.

(21) Appl. No.: 14/850,841

(22) Filed: Sep. 10, 2015

(65) Prior Publication Data

US 2016/0004531 A1    Jan. 7, 2016

Related U.S. Application Data

(63) Continuation of application No. 14/210,097, filed on Mar. 13, 2014, now Pat. No. 9,134,962.
(Continued)

(51) Int. Cl.
*G06F 9/44* (2018.01)
*G06F 9/455* (2018.01)
*G06F 9/445* (2018.01)

(52) U.S. Cl.
CPC ............... *G06F 8/70* (2013.01); *G06F 8/20* (2013.01); *G06F 8/60* (2013.01); *G06F 9/45504* (2013.01);
(Continued)

(58) Field of Classification Search
CPC ....... G06F 8/20–8/38; G06F 8/60–8/78; G06F 9/455
(Continued)

(56) References Cited

U.S. PATENT DOCUMENTS 5,729,746 A    3/1998    Leonard
5,764,989 A    6/1998    Gustafsson et al.
(Continued)

OTHER PUBLICATIONS

Zhang, Shuai, et al. "Cloud computing research and development trend." Future Networks, 2010. ICFN'10. Second International Conference on. IEEE, 2010. pp. 93-97.*
(Continued)

*Primary Examiner* — Satish Rampuria
(74) *Attorney, Agent, or Firm* — The Petruzzi Law Firm; James D. Petruzzi

(57) ABSTRACT

Techniques for developing and deploying software applications in a virtualized computing environment are described. A developer user is presented with a user interface providing options for accessing a software development project. Inputs are provided to the software development project. The inputs may include data and selection of a software component. A plurality of predefined data objects are accessed and an executable software application is generated. The application executes on virtual machine instances of the virtualized computing environment and is accessible by a plurality of end-users. The executable software application is developed within the multi-user computing and network services platform via the web-based user interface and is hosted by the multi-user computing and network services platform for use by end-users.

20 Claims, 18 Drawing Sheets

Related U.S. Application Data

(60) Provisional application No. 61/792,002, filed on Mar. 15, 2013.

(52) U.S. Cl.
CPC ............... *G06F 9/45558* (2013.01); *G06F 2009/45562* (2013.01)

(58) Field of Classification Search
USPC .................................. 717/100–123, 168–178
See application file for complete search history.

(56) References Cited

U.S. PATENT DOCUMENTS

| | | | | |
|---|---|---|---|---|
| 6,779,177 | B1* | 8/2004 | Bahrs | G06F 9/542 717/136 |
| 6,966,002 | B1* | 11/2005 | Torrubia-Saez | G06F 21/10 705/51 |
| 7,047,497 | B2* | 5/2006 | Patrizio | G06F 9/4443 715/760 |
| 7,146,615 | B1 | 12/2006 | Hervet et al. | |
| 8,006,226 | B2 | 8/2011 | Gentry et al. | |
| 8,365,138 | B2 | 1/2013 | Iborra et al. | |
| 8,458,246 | B2* | 6/2013 | Guney | H04L 67/303 707/695 |
| 8,713,098 | B1* | 4/2014 | Adya | H04L 63/0807 707/610 |
| 8,776,013 | B2 | 7/2014 | Riehl et al. | |
| 9,134,962 | B1* | 9/2015 | Stephens | G06F 8/20 |
| 2004/0010772 | A1 | 1/2004 | McKenna et al. | |
| 2006/0048097 | A1 | 3/2006 | Doshi | |
| 2007/0106946 | A1 | 5/2007 | Goetz et al. | |
| 2008/0022276 | A1 | 1/2008 | Coppinger et al. | |
| 2008/0127135 | A1 | 5/2008 | Bergstrom et al. | |
| 2008/0222572 | A1 | 9/2008 | Nathan et al. | |
| 2009/0193410 | A1* | 7/2009 | Arthursson | G06F 9/45504 717/173 |
| 2011/0035729 | A1 | 2/2011 | Sakhare et al. | |
| 2012/0124566 | A1* | 5/2012 | Federighi | G06F 8/61 717/164 |
| 2012/0210235 | A1* | 8/2012 | Sero | G06F 8/61 715/733 |
| 2012/0260237 | A1* | 10/2012 | Duddles | G06F 8/10 717/139 |

OTHER PUBLICATIONS

Buyya, Rajkumar, Chee Shin Yeo, and Srikumar Venugopal. "Market-oriented cloud computing: Vision, hype, and reality for delivering it services as computing utilities." High Performance Computing and Communications, 2008. HPCC'08. 10th IEEE International Conference on. IEEE, 2008. pp. 5-13.*

Lenk, Alexander, et al. "What's inside the Cloud? An architectural map of the Cloud landscape." Proceedings of the 2009 ICSE Workshop on Software Engineering Challenges of Cloud Computing. IEEE Computer Society, 2009. pp. 23-31.*

Roudaki, A.; Doroodchi, M., "Interactive Software Development Using Workflow," Future Computer and Communication, 2009. ICFCC 2009. International Conference on, pp. 3-7, Apr. 3-5, 2009.

Stary, C.; Vidakis, N.; Mohacsi, S.; Nagelholz, M., "Workflow-oriented prototyping for the development of interactive software," Computer Software and Applications Conference, 1997. COMPSAC '97. Proceedings., The Twenty-First Annual International, pp. 530-535, Aug. 11-15, 1997.

Potineni, S.; Bansal, S.K.; Amresh, A., "ScrumTutor: A web-based interactive tutorial for Scrum Software development," Advances in Computing, Communications and Informatics (ICACCI), 2013 International Conference on, pp. 1884-1890, Aug. 22-25, 2013.

Feldmann, M.; Hubsch, G.; Springer, T.; Schill, A., "Improving Task-driven Software Development Approaches for Creating Service-Based Interactive Applications by Using Annotated Web Services," Next Generation Web Services Practices, 2009. NWESP '09. Fifth International Conference on, pp. 94-97, Sep. 2009.

Persson, P.; Hedin, G., "An interactive environment for real-time software development," Technology of Object-Oriented Languages, 2000. Tools 33. Proceedings. 33rd International Conference on, pp. 57-68, 2000.

Knoll, P.; Mirzaei, S., "Development of an interactive molecular dynamics simulation software package," Review of Scientific Instruments, vol. 74, No. 4, pp. 2483-2487, Apr. 2003.

* cited by examiner

INTERACTIVE CONTENT DEVELOPMENT

CROSS REFERENCE TO RELATED APPLICATIONS

This application is a continuation of U.S. patent application Ser. No. 14/210,097, filed Mar. 13, 2014, now U.S. Pat. No. 9,134,962, issued Sep. 15, 2015, which claims benefit under 35 U.S.C. § 119(e) of U.S. Provisional Patent Application No. 61/792,002, filed Mar. 15, 2013, the entire contents of which are incorporated herein by reference.

BACKGROUND

A service provider, such as an entity that operates a provider network, may offer computing resources, such as computing instances and storage resources to customers (who may also be referred to as entities or users). A customer may be any person or entity who accesses computing resources of a service provider. The service provider may, for example, provide a computing and network services platform. Multiple customers may access the computing and network services platform via a computing node and issue instructions to the web services platform. The computing and network services platform may be also be referred to as a multi-tenant computing and network services platform to denote that multiple customers may access the platform. The computing and network services platform may respond to instructions by performing computing operations on one or more of a plurality of computing nodes that make up the computing and network services platform.

Cloud computing refers to a computing environment for enabling on-demand network access to a pool of computing resources. As used herein, a cloud or cloud infrastructure may refer to any digital-based environment that allows for the storage of digital assets and the execution of processes or binary code on a networked array of computing device(s). A cloud can provide additional features such as database access, web access, network access, process instantiation and/or instancing, and any other form of digital processing/manipulation/communication/storage that occurs within the cloud infrastructure.

Many cloud computing services involve virtualized resources and may take the form of web-based tools or applications that users can access and use through a web browser as if the virtualized resources were programs installed locally on their own computers. The data stored for users of such systems are typically hosted in computing systems located in a computing data center. A data center is a facility that houses computer systems and various networking, storage, and other related components. Data centers may, for example, provide computing services to businesses and individuals as a remote computing service or to provide "software as a service." To facilitate utilization of data center resources, virtualization technologies may allow a single physical computing machine to host one or more instances of virtual machines that appear and operate as independent computer machines to a connected computer user. With virtualization, the single physical computing device can create, maintain, or delete virtual machines in a dynamic manner.

SUMMARY

Disclosed herein are methods and systems for developing and deploying software applications in a virtualized computing environment hosted by a multi-user computing and network services platform. In some embodiments, a web-based user interface providing one or more options for accessing a software development project hosted by the multi-user computing and network services platform is presented to a developer user of the multi-user computing and network services platform. The multi-user computing and network services platform receives, via the user interface, inputs to the software development project. The inputs comprise at least one of data and a selection of a software component usable to form a software application.

In response to receiving the inputs, a plurality of predefined data objects available within the multi-user computing and network services platform is accessed. The predefined data objects are usable to build the software application. Using the plurality of predetermined data objects, an executable software application is automatically generated. The executable software application is configured to execute on one or more virtual machine instances of the virtualized computing environment and accessible via the multi-user computing and network services platform to a plurality of end-users.

The multi-user computing and network services platform provides access to instances of the executable software application to the plurality of end-users. A plurality of requests from the plurality of end-users to access the instances of the executable software application is processed. The executable software application is developed within the multi-user computing and network services platform via the web-based user interface and is hosted by the multi-user computing and network services platform for use by end-users.

The foregoing summary is illustrative only and is not intended to be in any way limiting. In addition to the illustrative aspects, embodiments, and features described above, further aspects, embodiments, and features will become apparent by reference to the drawings and the following detailed description.

BRIEF DESCRIPTION OF THE DRAWINGS

The accompanying drawings, which are included to provide a further understanding of the invention, are incorporated in and constitute a part of this specification, illustrate embodiments of the invention and together with the detailed description serve to explain the principles of the invention. No attempt is made to show structural details of the invention in more detail than may be necessary for a fundamental understanding of the invention and the various ways in which it may be practiced.

DETAILED DESCRIPTION OF ILLUSTRATIVE EMBODIMENTS

Figure 1:
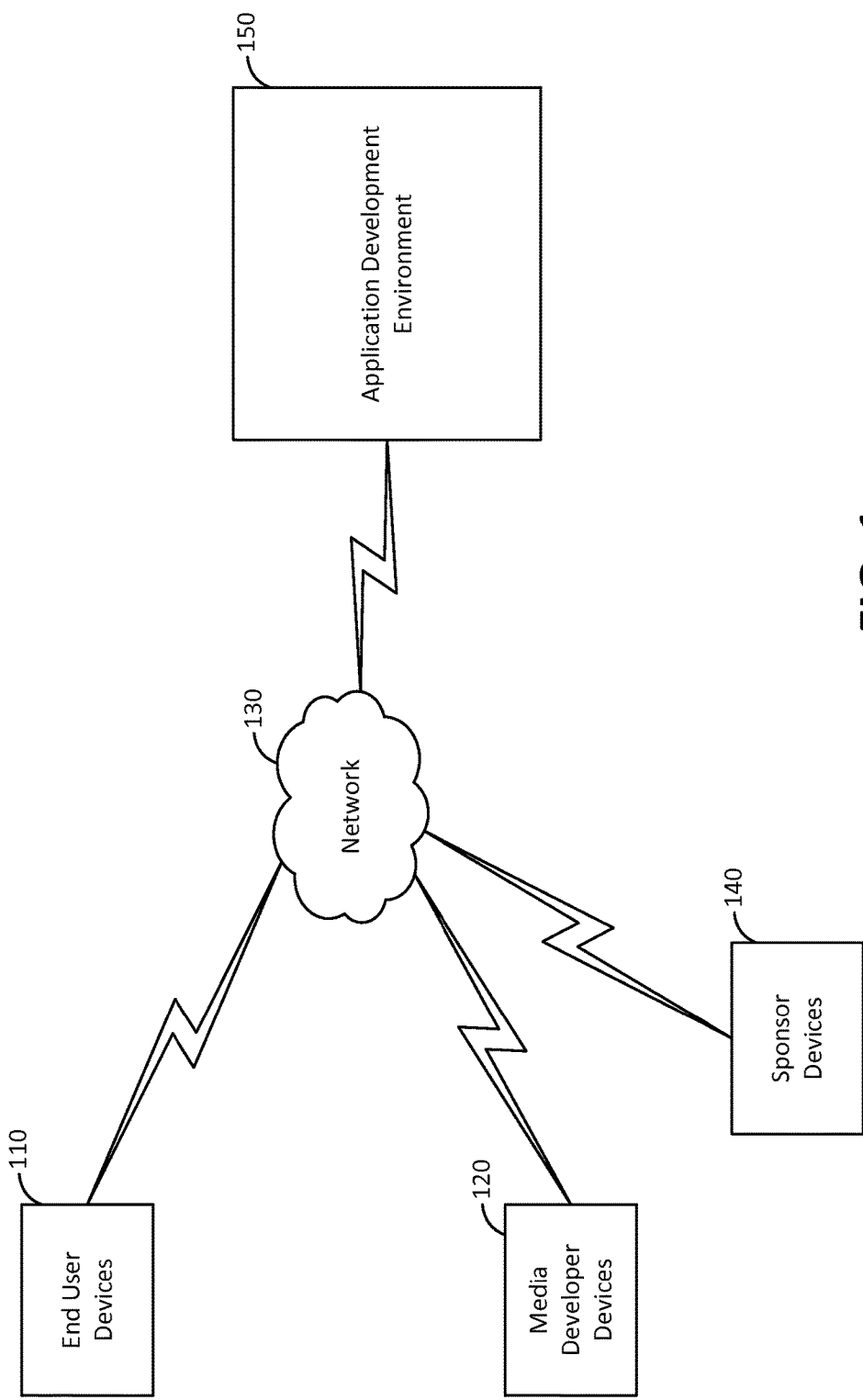
FIG. 1 illustrates an example of a high-level system diagram of a system for content development, in accordance with some aspects of the disclosure.

The embodiments of the invention and the various features and advantageous details thereof are explained more fully with reference to the non-limiting embodiments and examples that are described and/or illustrated in the accompanying drawings and detailed in the following description. It should be noted that the features illustrated in the drawings are not necessarily drawn to scale, and features of one embodiment may be employed with other embodiments as the skilled artisan would recognize, even if not explicitly stated herein. Descriptions of well-known components and processing techniques may be omitted so as to not unnecessarily obscure the embodiments of the invention. The examples used herein are intended merely to facilitate an understanding of ways in which the invention may be practiced and to further enable those of skill in the art to practice the embodiments of the invention. Accordingly, the examples and embodiments herein should not be construed as limiting the scope of the invention, which is defined solely by the appended claims and applicable law. Moreover, it is noted that like reference numerals represent similar parts throughout the several views of the drawings.

Software development is typically viewed as an activity associated with individual developers or groups of developers. Since desktop computing has become widely available, software development has been associated with activity on a workstation or a desktop computer. Software development projects typically use client-centric development applications. Recently, computational resources such as cloud computing services and network bandwidth have increased dramatically. As the scale of software development increases and the capabilities of available computational resources improve, in particular the capability to collaborate via network of computers, the view that software development is a desktop-based client-centric activity is no longer applicable.

Because software development teams need to coordinate activities related to software projects, some parts of the software development process have shifted to a client-server network environment to enable the use of a network of computational resources to process and coordinate the activities of multiple developers and teams. Such need for coordinating software development activity exists even on a standalone computer. Software development solutions that focus on a typical integrated development environment provide limited direct support for coordinating software development activity. As a result, much of the software development work is implemented in an ad hoc manner with each team recreating its own process, and tools, which can lead to inefficiencies, security issues, and errors. For example, the process of bringing together various components of a software application project developed on different computers or on the same computer but at different times also can be error prone and require an inordinate amount of effort by the developers. Correct builds require complex build environments to be replicated as closely as possible on many different desktops. However, many of the dependencies between the software components and the environment (e.g., registry entries, versions, etc.) in which the software components are built are implicit and hard to enumerate in order to replicate the environment wholly during the build process.

Furthermore, software development teams must consider security of the software during development as well as during production. Copies of software may be present in multiple locations and computers, each of which must be secured from unauthorized access. After finalization of the software build, distribution of the master build must ensure against theft and piracy.

Thus, there is a need for an improved software development model where software development activities can be provided in an efficient and secure manner. While the above example is provided in the context of software development, the same concerns exist for any endeavor where a digital data product is developed and made available to others.

To address these issues, the present disclosure describes a cloud-based development environment where the entire process of initiating, developing, and deploying a software application may be provided by an integrated development and deployment environment that is entirely provided by a provider network such as a cloud computing provider. More generally, the disclosure describes at least an apparatus, systems, and methods for content development, and providing an application development tool for creating interactive content of all types. Specifically, apparatus, systems, and methods are described herein for providing a virtual project environment wherein content can be created, constructed, programmed, and/or edited in a visual environment.

In at least some embodiments, software applications may be developed and deployed in a virtualized computing environment hosted by a multi-user computing and network services platform. For example, content such as videos, audio, applications, etc. may be created that allow a user, when accessing the content, to have one or more interactions with the content. In some aspects, a virtual project environment provides a platform for developers to build a unique application by uploading and editing content including adding interactive options. As used herein, a developer refers to any person, company, or other entity that has registered with the virtual project environment system and has been granted access to tools to create content. In some aspects, sponsors, which can include any person, company, or other entity that would like to provide statistical/data gathering and analysis, marketing, monetary, or any other services may also be granted access to all or part of the virtual project environment. In many embodiments described herein, the system may be cloud-based, thereby reducing some of the bandwidth concerns associated with both editing and viewing interactive content. Developers wishing to create content may access the systems described herein and create any type of content. For example, one developer may wish to create an interactive computer application while another developer may wish to create an interactive video.

Turning now to FIG. 1, a high-level system diagram of a system 100 is illustrated where one or more aspects of the disclosure may be implemented. System 100 may comprise one or more end user devices 110 for viewing, listening, or otherwise accessing content developed via components of system 100, such as, for example, video content, audio content, computer applications, video games, etc. The end user devices 110 may include a computer. The end user devices 110 may communicate via one or more communication links with an application development environment 150 over a network 130, such as a cloud network. The network 130 may include a computer. One or more developer devices 120 may also be configured to communicate with the application development environment 150 via one or more communication links and the network 130 to create interactive content that can be reproduced by the end user devices 110. Each developer may create different types of content if desired. The end user devices 110 may be configured to reproduce the interactive content in the form of displayed images, sound, etc.

In accordance with some aspects, one or more sponsors 140 may also be configured for communicating with the application development environment 150 via one or more communication links and the network 130. Sponsors 140 may be any person, company, or other entity that may provide, for example, statistical/data gathering and analysis, marketing, monetary, or any other services that can provide additional content or services.

Figure 2:
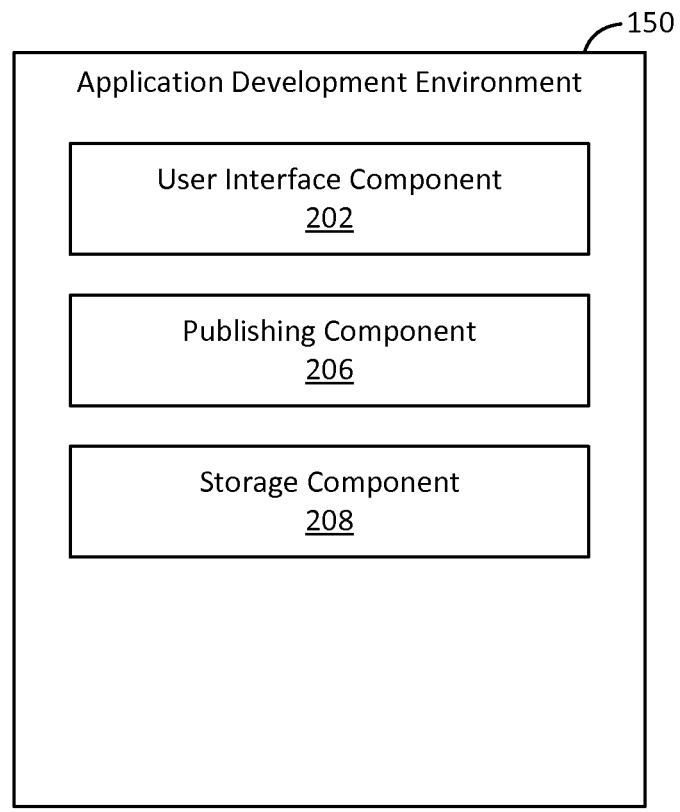
FIG. 2 illustrates an example of a functional block diagram of an application development environment, in accordance with some aspects of the disclosure.

FIG. 2 is a functional block diagram depicting application development environment 150 in greater detail. In some aspects, one or more of the components depicted in FIG. 2 may be cloud-based. Application development environment 150 may include a user interface component 202. User interface component 202 may be configured to present one or more user interfaces enabling users, such as developers, sponsors, and end users to create content, view content, interact with content, provide sponsorships, and/or other actions. For example, the user interface component 202 may include an end user component for providing a set of predefined digital assets that define how data used by the application development environment 150 may be viewed and/or interacted with by an end user.

User interface component 202 may also include a developer component configured to provide a visual editing interface control, which may facilitate the construction of application data, logic, or any other editing related task. In some aspects, the developer component of the user interface component 202 may provide a default editor that provides a core set of action objects that can be extended, modified, and used together to define a content project. For example, the developer component of the user interface component may provide an interface for developer devices 120 to create interactive content, such as, for example, interactive video and/or audio (e.g., a music video, a movie clip, a video/audio streaming segment, and/or the like). For example, a developer component of the user interface component 202 may be configured to present options for uploading content to be edited and to add one or more interactive components to the content.

In addition, user interface component 202 may include a sponsor component, which may be configured to provide a visual editing interface control open to sponsors. In some aspects, a developer may define what action objects can be exposed to a sponsor, as well as what components of said action objects are exposed. A sponsor may user sponsor component of user interface component 202 to access interface and development libraries to define a set of behaviors to perform upon specific data sets of the exposed action objects, and may return the results. For example, an advertising sponsor may, via the sponsor component, monitor content a user is experiencing, the path a user takes in experiencing the content, etc., and may offer incentives, such as award points based on the user's interactions.

A publishing component 206 may also be provided for publishing content in various digital formats. In some aspects, the digital formats may be specific to the cloud application. An end user may view the published data through the end user component of the user interface. A storage component 208 may also be provided for storing content both during the editing process and after the editing is complete.

Figure 3:
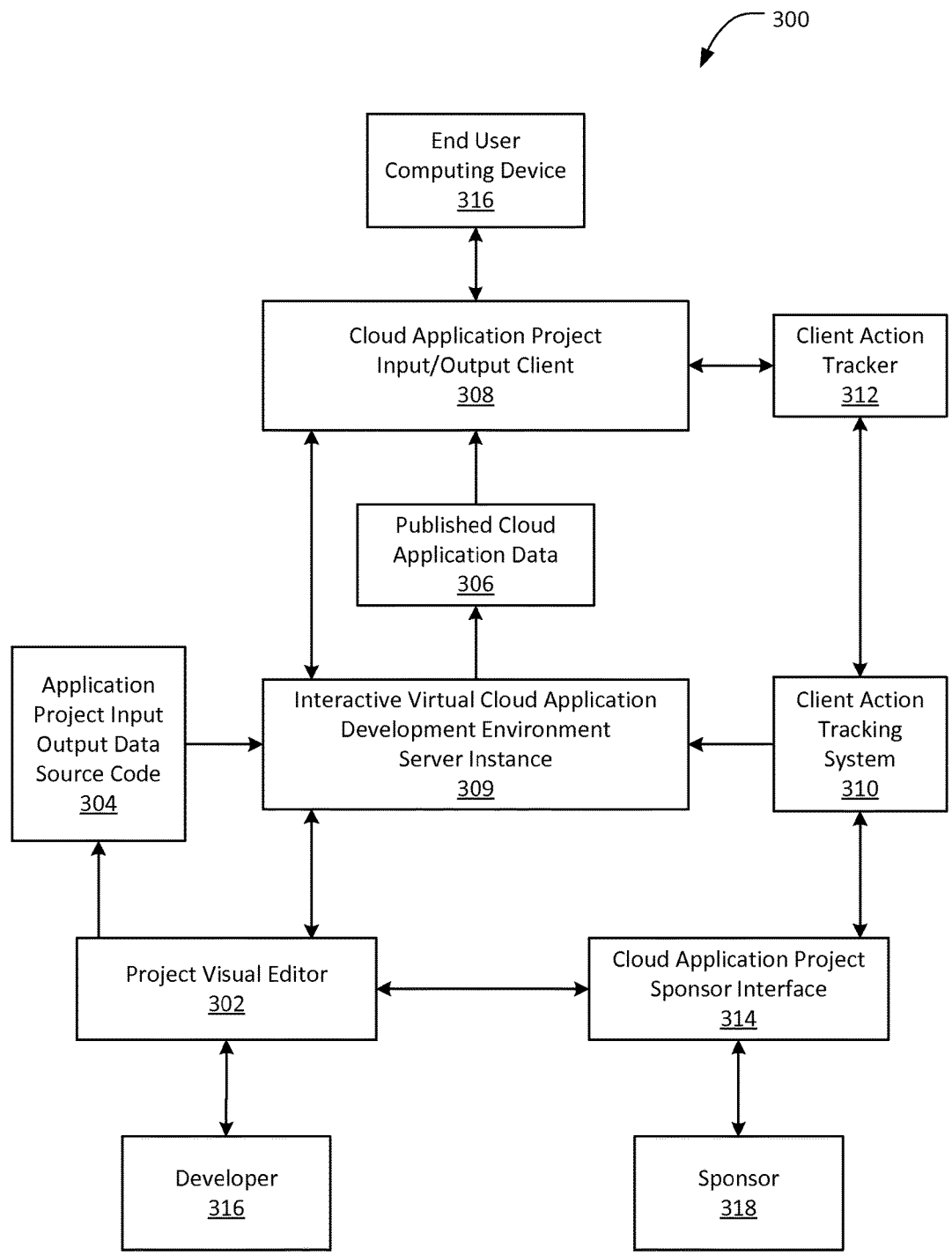
FIG. 3 illustrates an example of a functional block diagram of an application development environment, in accordance with some aspects of the disclosure.

FIG. 3 is a functional block diagram depicting one example of a development environment 300. Environment 300 may include a cloud-based server application cluster and set of development modules that may provide a centralized virtual project environment where cloud-based applications can be constructed/created/programmed/edited in a visual environment. Environment 300 may include cloud-based server applications which may include a cluster of application images running as instances on a cloud computing infrastructure. The instances may utilize default and developer specific configuration data which may be stored on digital media available to the applications.

Environment 300 may include development tools that, in some embodiments, may include a set of software libraries and tools that a software developer may use to construct additional configuration data that defines an application as well as additional developer tools that might be configured to allow editing of the application's data.

In one embodiment, environment 300 may include a project visual editor 302, which may be a visual editing interface control configured to facilitate the construction of application data, logic, and other programming or editing related tasks in a cloud application. The project visual editor 302 may include a set of action objects that can be extended, modified, and used together to define a cloud application or to define digital assets created by the cloud application by a developer, sponsor, or end user. The configuration of the action objects and any additional digital asset used in conjunction with the action objects may be saved as project data that can be stored on digital media available to the application instances and defined by either the default or developer specific data's settings.

In one embodiment, the action objects may be digital objects that contain programming logic and/or data that define a behavior and can invoke other action objects or communicate to the application cluster. The programming logic can be further defined as any form of scripting or programming language constructed through the use of software libraries provided with the development tools.

In one embodiment, environment 300 may include application input/output data and source code 304 which may comprise developer unique data and source code constructed from libraries provided by the development tools. The application input/output data and source code 304 may define how digital assets provided by or constructed by the developer cloud application is viewed, displayed, and interacted with. The application input/output data and source code 304 may provide input and output streams to facilitate the visual and user interaction handling of the cloud application. The data may be coalesced and compiled during publishing of the cloud application in order to provide the final client and any additional functionality the developer might provide.

In one embodiment, environment 300 may include published cloud application data 306 that may comprise compacted and compiled digital assets that have been previously defined by project data created by environment 300. The published cloud application data 306 can be provided in various digital formats specific to the cloud application. End users may view the published cloud application data 306 using a developer defined client interface. Additional encryption and security measures can be incorporated by the developer. The environment 300 may also apply default encryption and security measures to the final published data.

The environment 300 may include a cloud application input/output client 308 that may be a set of predefined digital assets that define how data used by the cloud application is viewed and/or interacted with by the end user. The client action tracking system 310 may facilitate in the tracking of user interactions with content provided by the client interface. The tracking of interactions may be captured within client action tracker 312, sent from the client action tracker 312 to the client action tracking system 310, and communicated to other systems of environment 300. The client action tracker 312 may be a subsystem within cloud application project input/output client 308 that is the published version of the data. The client action tracker 312 may comprise methods and/or processes defined through cloud application project sponsor interface 314 and may be specific to and/or required by the cloud application project input/output client 308. The tracked interactions may be used, for example, for gathering statistics, monetary or credit based exchanges, and any other possible uses from the gathered data. The type of data that is collected as well as how the data is utilized may be defined through the cloud application project sponsor interface 314.

The cloud application project sponsor interface 314 may be a visual editing interface control configured to facilitate the construction of application data, logic, and any other programming or editing related tasks in a visualized manner. The editor for the cloud application project sponsor interface 314 may provide limited access to developer defined/exposed action objects in order to allow for the tracking of end user interactions within the cloud application project input/output client 308. The developer may define what action objects can be exposed to the sponsor as well as what components of the action objects are exposed. The sponsor may use the cloud application project sponsor interface 314 and development libraries to define a set of behaviors and methods that are performed on specific data sets of exposed action objects and return the results of the behaviors and methods to the client action tracking system 310 where the sponsor can define how the data is stored. The developer can expose additional methods and/or procedures for the sponsor to use in conjunction with the default methods and/or procedures provided by the development tools.

A sponsor 318 may be a person, company, or any other entity that provides statistical/data gathering and analysis, marketing, monetary, or any other possible services that can provide additional content or services for the cloud application. A developer 316 may be a person, company, or any other entity that is allowed/granted their own cloud instance (for example, instance 309 in FIG. 3) by environment 300 and development tools to build their own/unique cloud based application that runs within their granted instance running on the cloud application infrastructure. The end user may be any person who uses the developed cloud based application via, for example, an end user computing device 316 to view/interact/edit content provided by developer 316 or sponsor 318.

Figure 4:
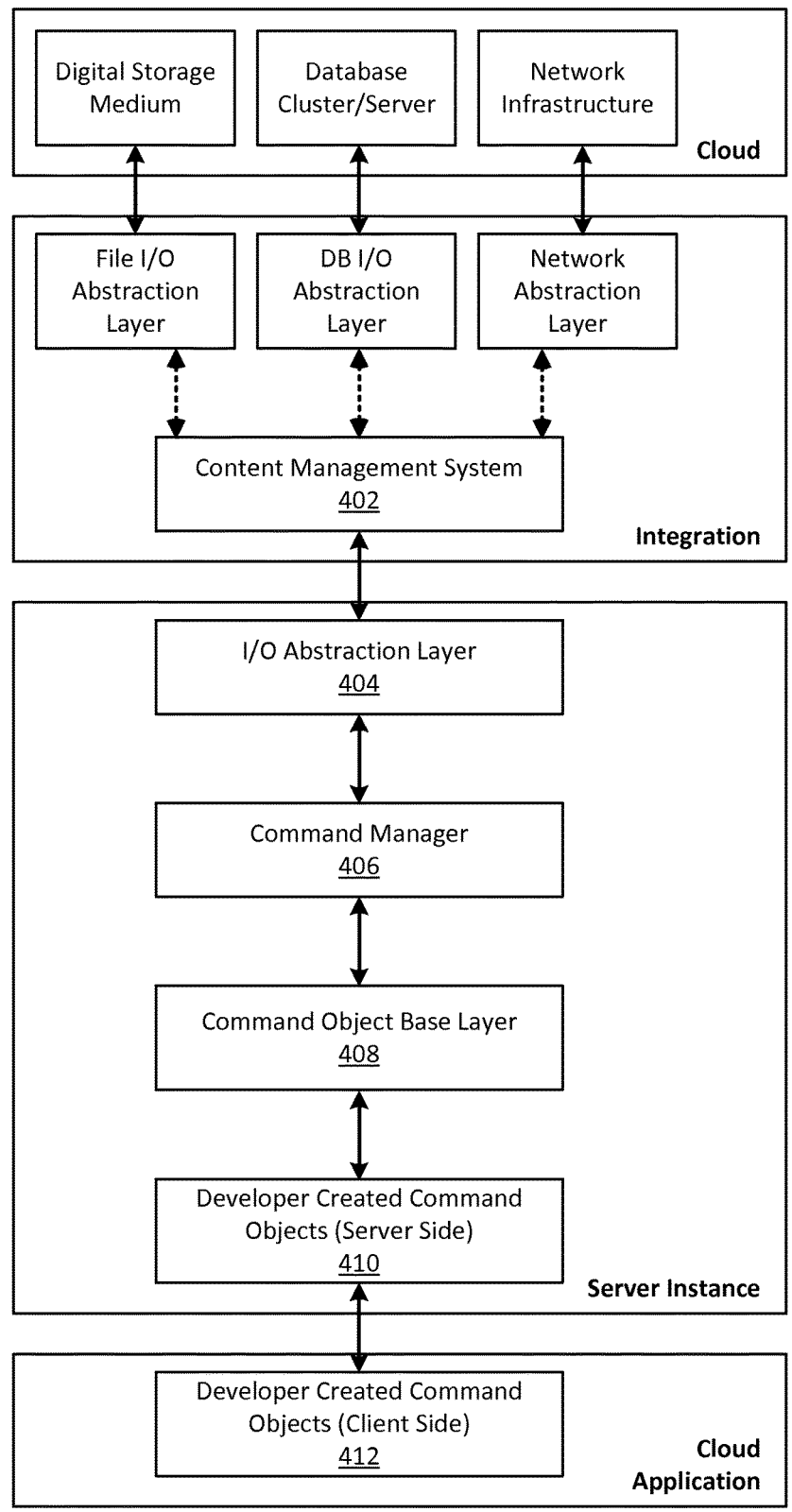
FIG. 4 illustrates an example of a functional block diagram of an application development environment, in accordance with some aspects of the disclosure.

FIG. 4 is a functional block diagram depicting additional details of development environment 300. A content management system 402 may include any software application or process that manages digital content as well as incorporates the management of common digital content storage methods and procedures. The common digital content storage methods and procedures may include, but are not limited to, common feature sets such as user and asset management services/systems, a permissions/security system that can filter digital assets based on the user viewing and the digital assets permissions, as well as other services that yields any form of processing and/or managing digital assets that may be unique to the content management system 402, the cloud infrastructure, and/or both.

The input/output abstraction layer 404 may be a set of code/methods/procedures that integrates with content management solution 402 in order to expose the content management solution 402's specific input and output related data and code/methods/procedures in a standardized way, allowing for more simplistic and unified cloud application development. Command manager 406 may include a set of code/methods/procedures and digital data which define a common command object language (CCOL) that can be expanded upon by a cloud application developer in order to achieve a task/action or processing of digital assets that is unique to the developer's application. The command manager 406 may be configured to handle the processing of commands when invoked by the developer's cloud application. The command manager 406 may translate commands to some form of service/process/procedure/result that can be understood or broken down to a format that the content management solution 402 can process.

Command object base layer 408 may be a default command object that provides data and methods/procedures for creating a common format for the communication of command objects, and any developer defined derivation between the developer's cloud application and the server instance. Developer defined command objects may be expanded/extended instances of the default command object. Developer defined command objects (server side) 410 may include methods/procedures and data that extend existing methods/procedures and data of the command object base layer 408 in order to handle the server side processing of the developer modified command object. Developer command object definition (client side) 412 may include methods/procedures and data that extend the methods/procedures and data of the command object base layer in order to handle the client side processing of the developer modified command object.

FIGS. 5-9 illustrate a series of example user interface displays that may be presented on developer device 120 to a developer for editing content (e.g., a video, application, game, etc.). The interface displays may be generated by the application development environment 150 (shown in FIG. 1). The application development environment 150 may include a computer-readable medium that comprises code segments or sections for, when executed on a computer, carrying out the methods described herein.

Figure 5:
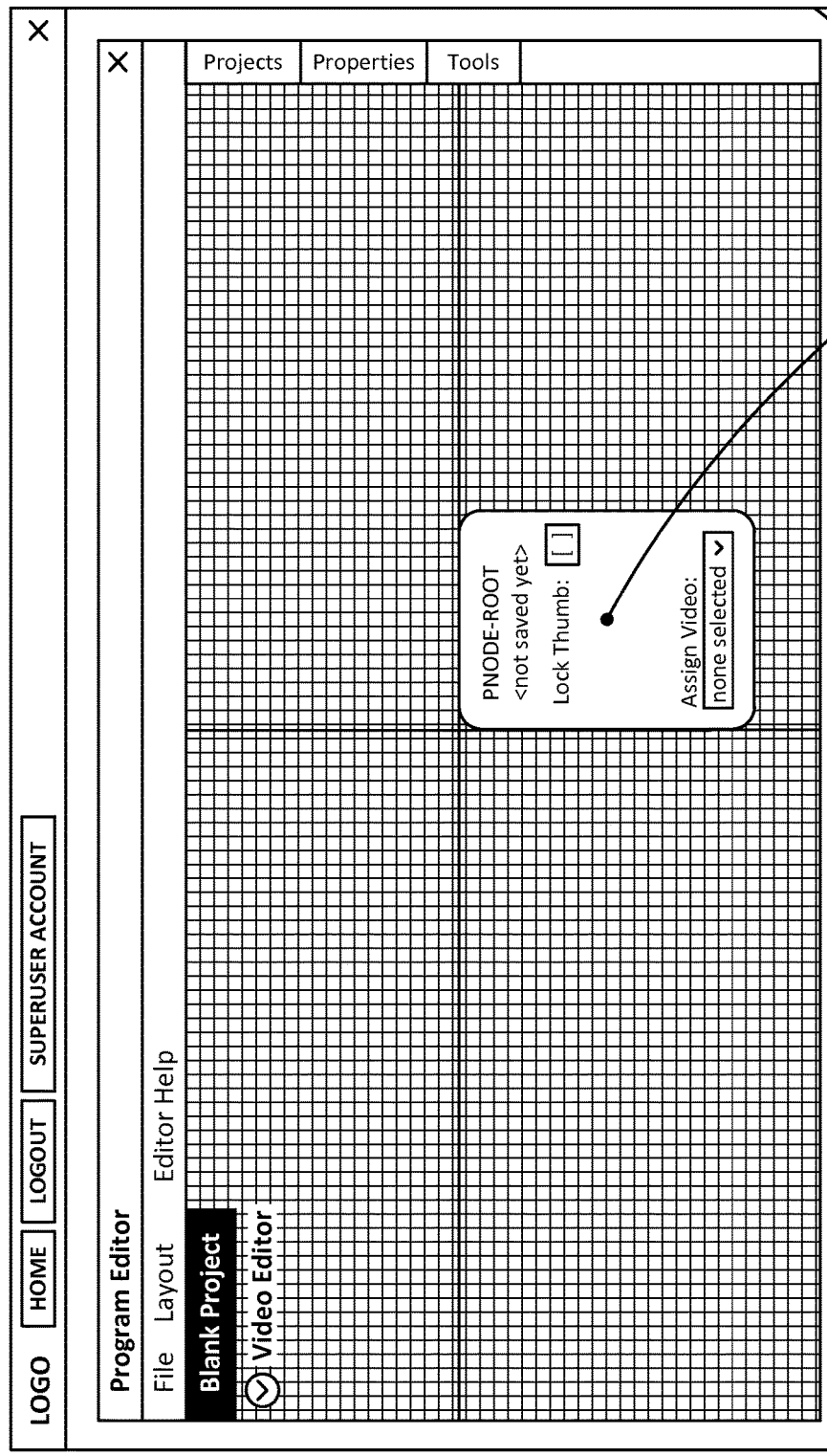
FIG. 5 illustrates an example screenshot of a user interface for creating/editing content, in accordance with some aspects of the disclosure.

As illustrated in FIG. 5, after accessing (e.g., logging into) the application development environment 150, for example via the developer component of the user interface component, and selecting an option to create a new project, an empty project node 502 may be loaded. The empty project node may include an option to select content (e.g., video) from a content list (e.g., video list). The content list may be provided on the developer device 120, for example, as a drop-down list, a menu list, and the like. The content list may comprise content previously uploaded by the user or by another user who has made the content available. In some aspects, an option may be presented for the user to upload new content.

Figure 6:
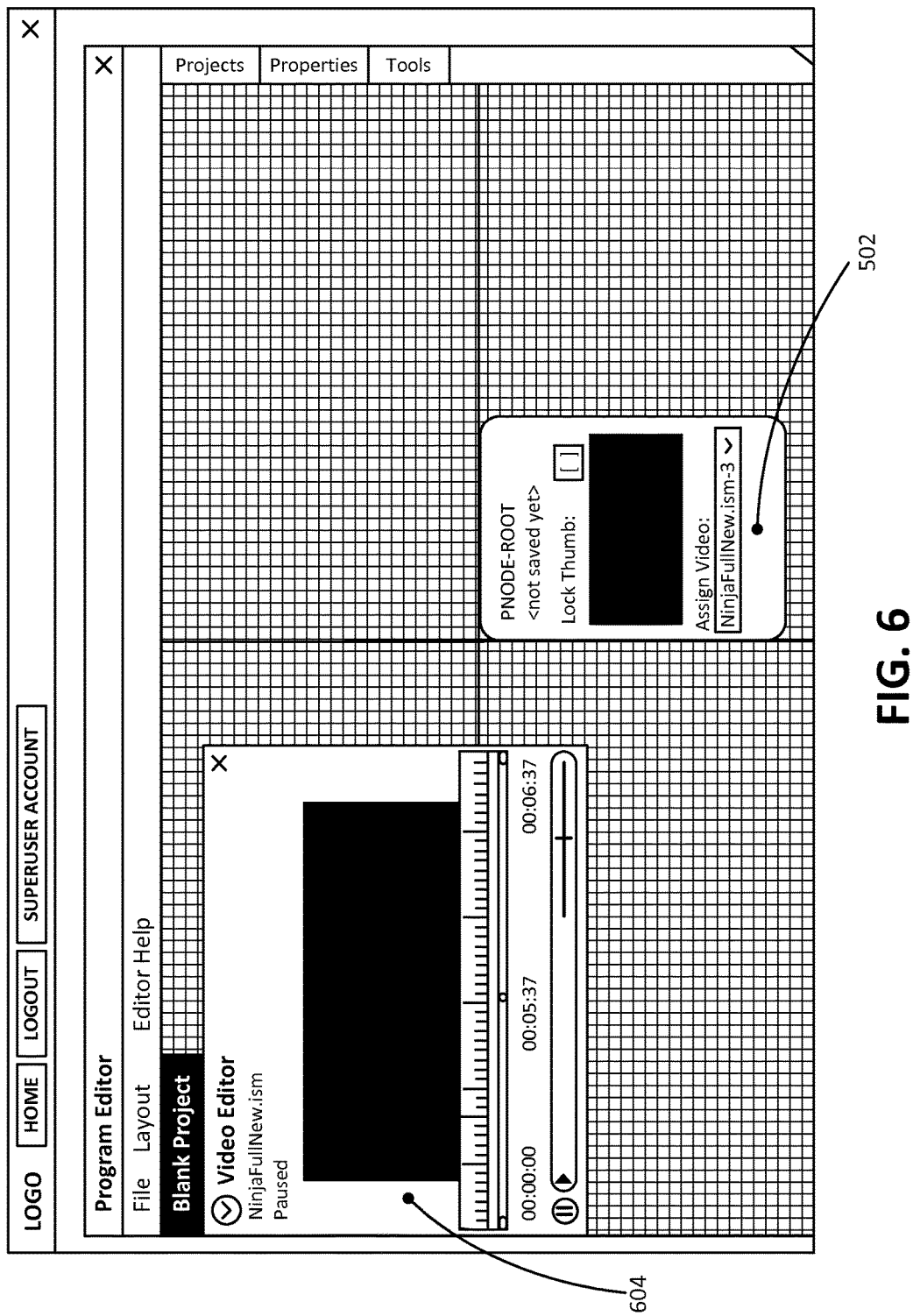
FIG. 6 illustrates an example screenshot of a user interface for creating/editing content, in accordance with some aspects of the disclosure.
Figure 7A:
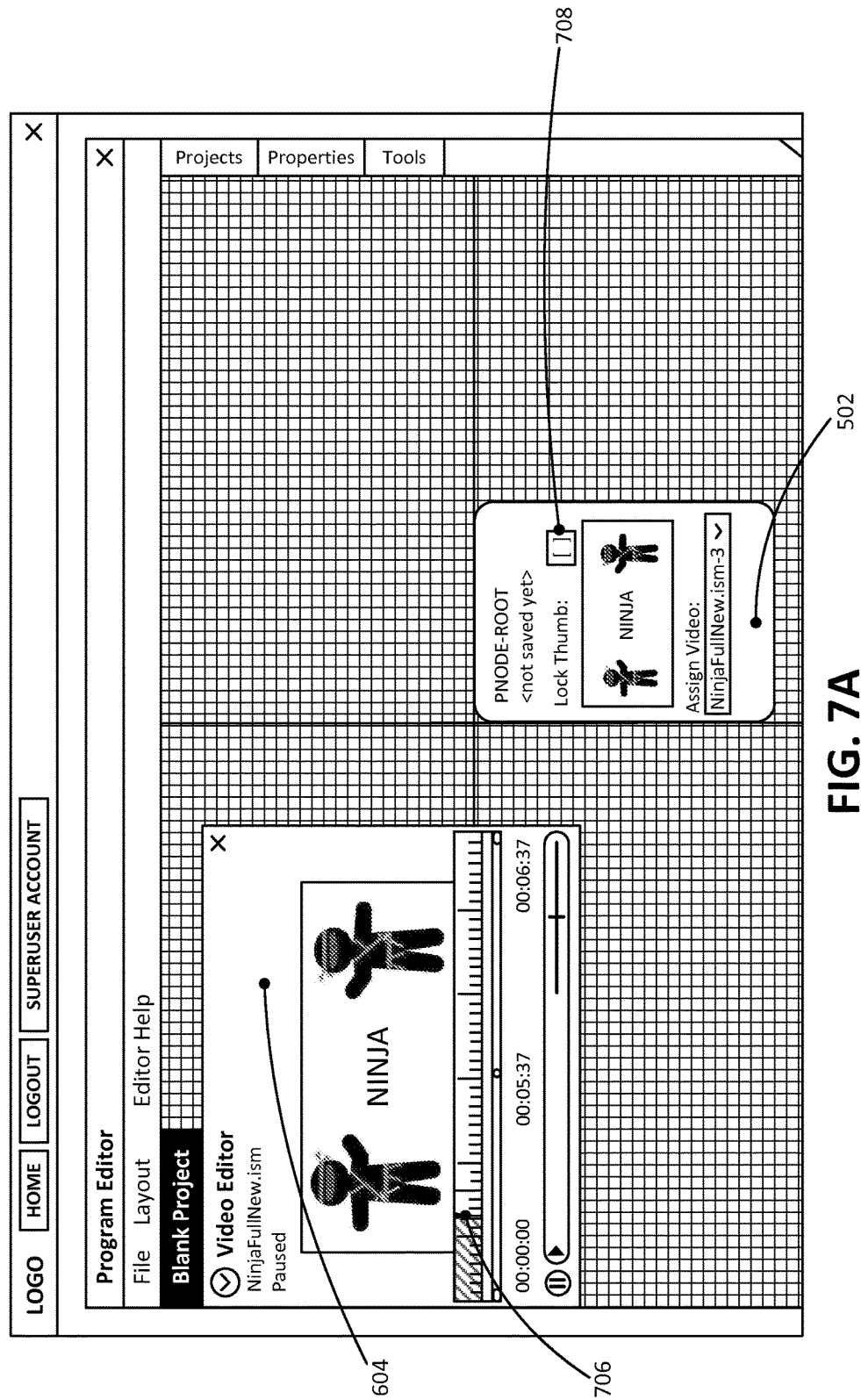
FIG. 7A illustrates an example screenshot of a user interface for creating/editing content, in accordance with some aspects of the disclosure.
Figure 7B:
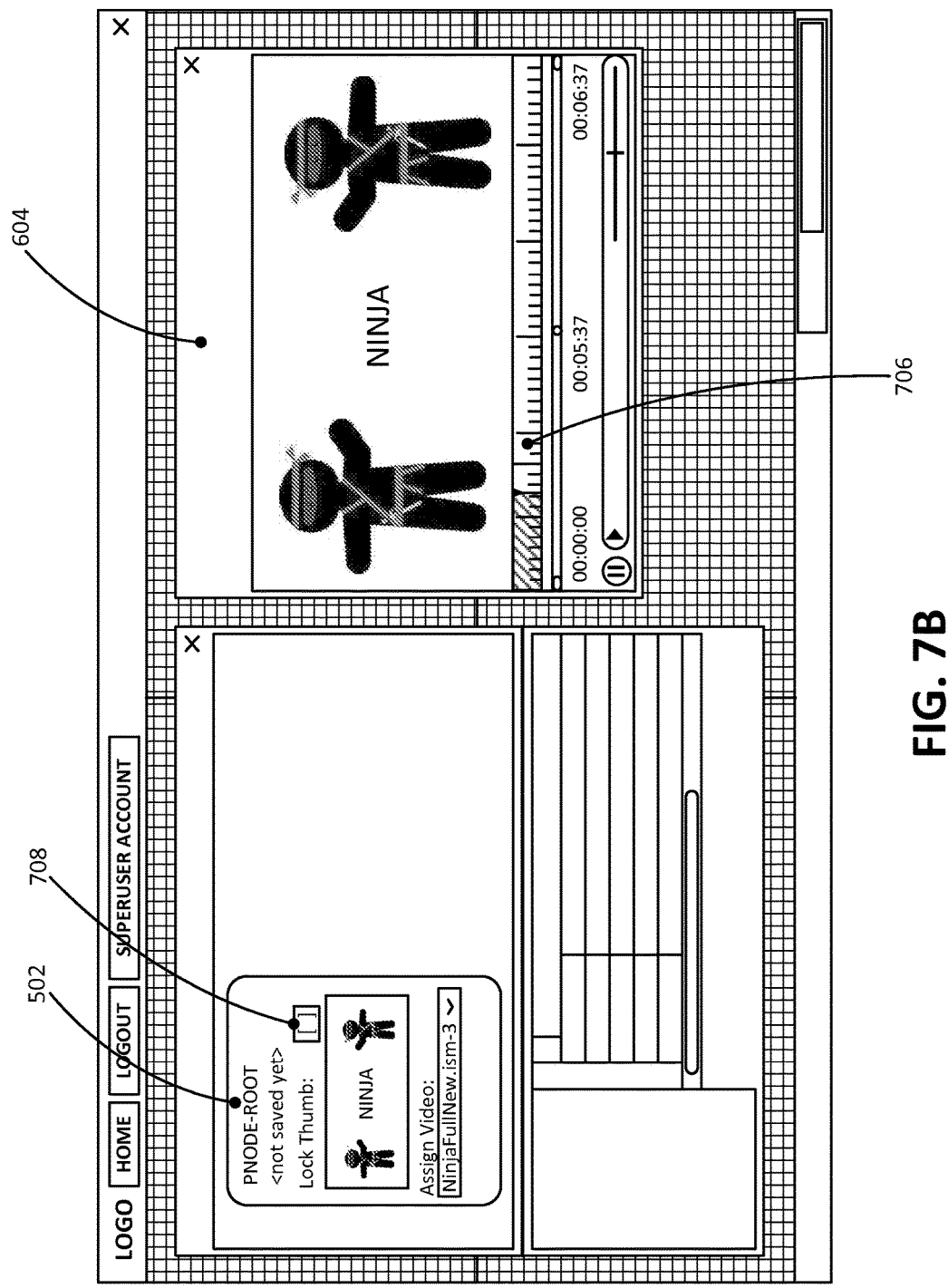
FIG. 7B illustrates an example screenshot of a user interface for creating/editing content, in accordance with some aspects of the disclosure.

FIG. 6 illustrates an example of a screen display after particular content (e.g., a video) has been selected. When content has been loaded, a content player 604 and the project node 502 may be populated with the content (e.g., video), and the content may be paused. As illustrated in FIGS. 7A and 7B, the content player 604 may include a scrub bar marker 706 that may be used to select a content frame (e.g., a video frame, an audio frame, or the like). For example, the scrub bar marker 706 may be used to select a content frame that best represents the content. As the scrub bar marker 706 is moved, the project node 502 may be populated with the selected content frames. As illustrated at 708, the content frame can be changed while an editing option is unlocked.

Figure 8A:
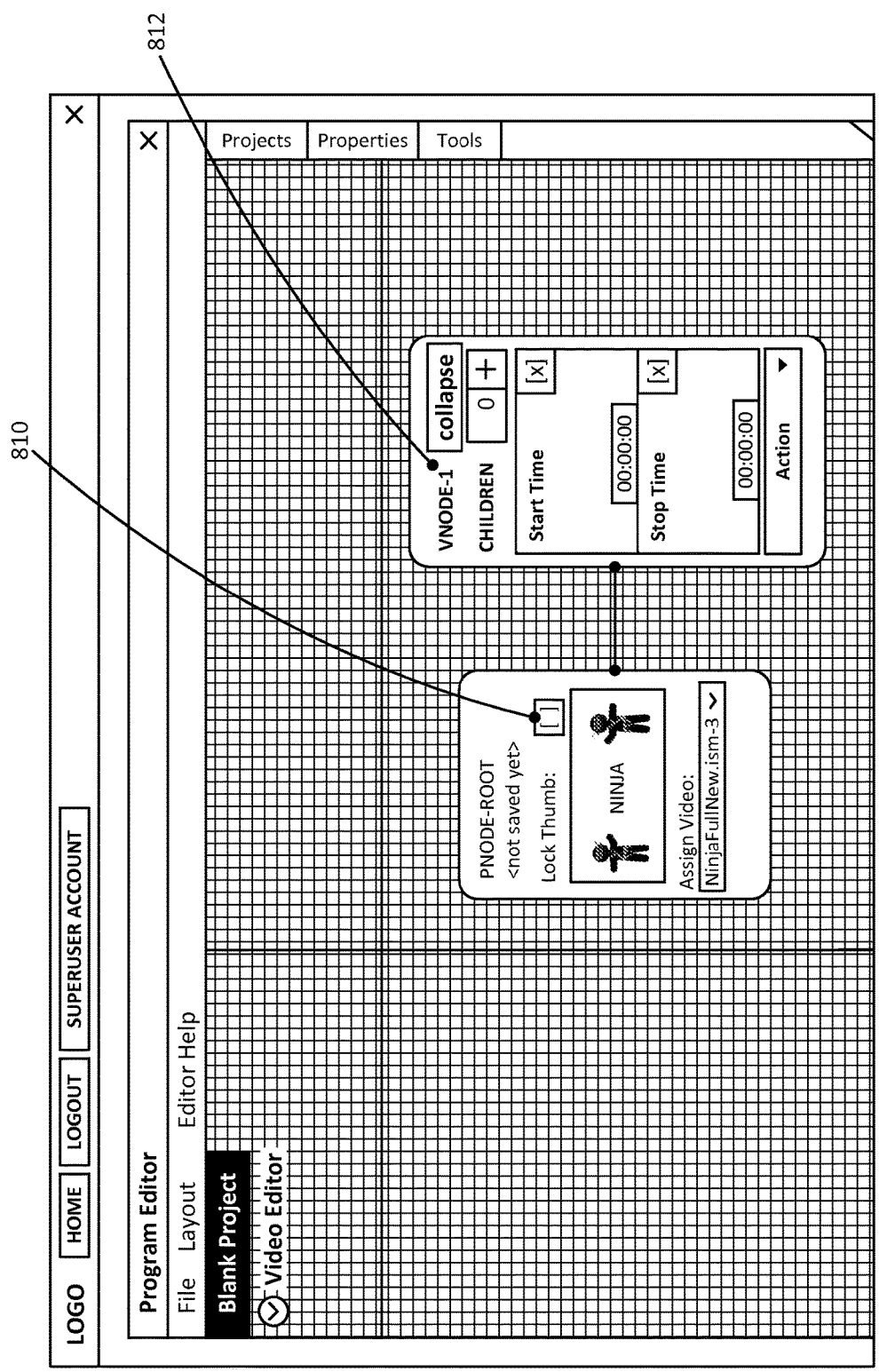
FIG. 8A illustrates an example screenshot of a user interface for creating/editing content, in accordance with some aspects of the disclosure.
Figure 8B:
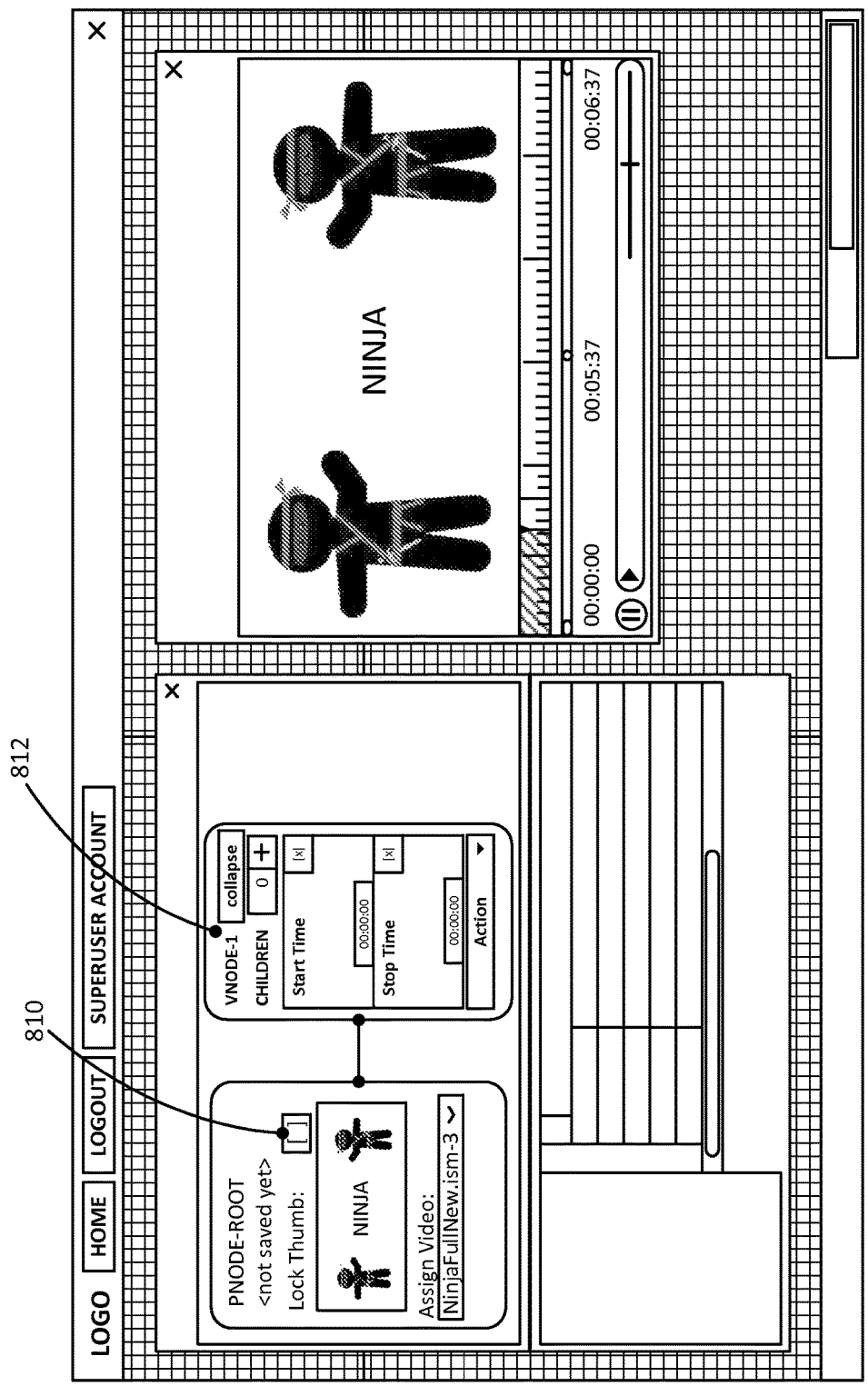
FIG. 8B illustrates an example screenshot of a user interface for creating/editing content, in accordance with some aspects of the disclosure.
Figure 9A:
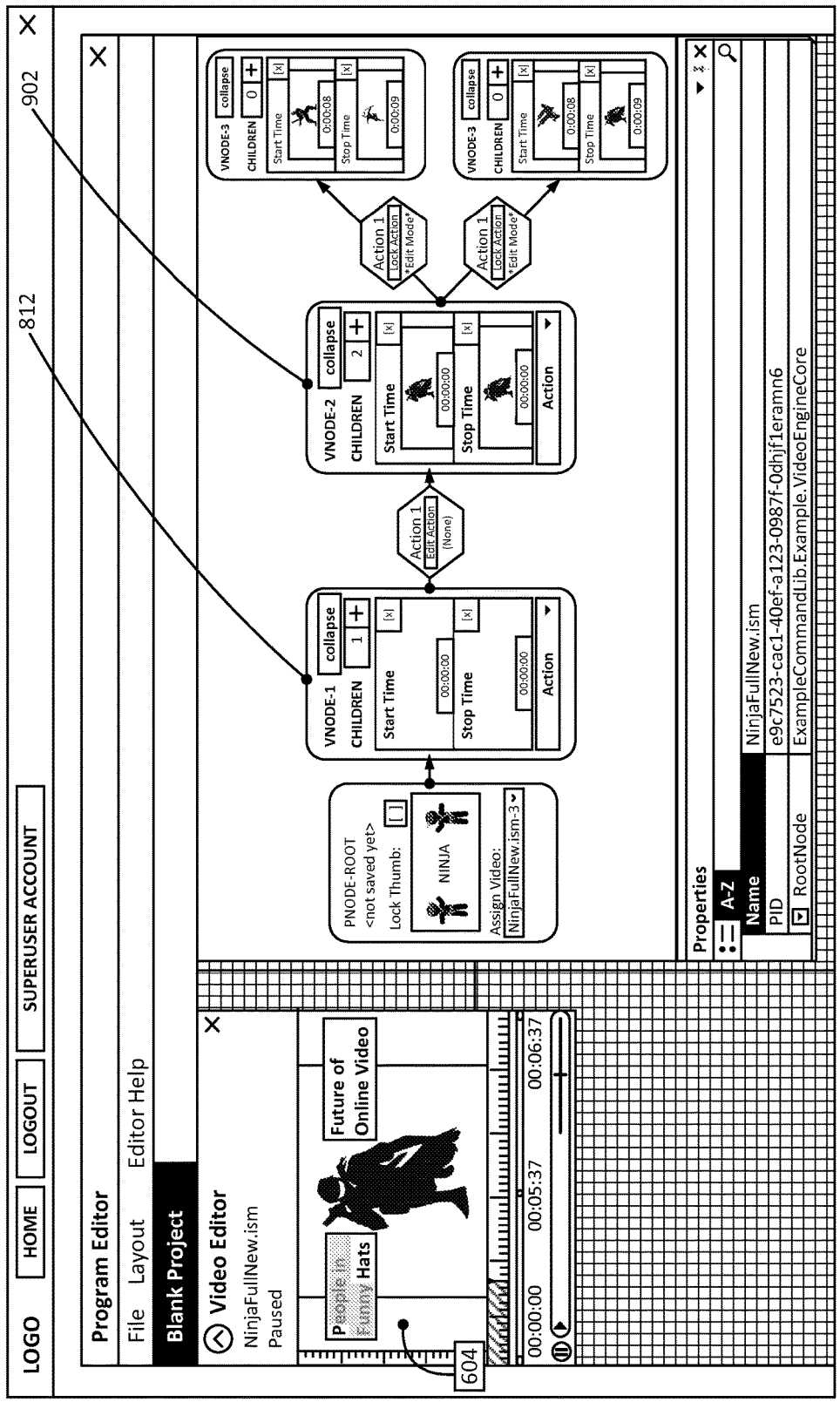
FIG. 9A illustrates an example screenshot of a user interface for creating/editing content, in accordance with some aspects of the disclosure.
Figure 9B:
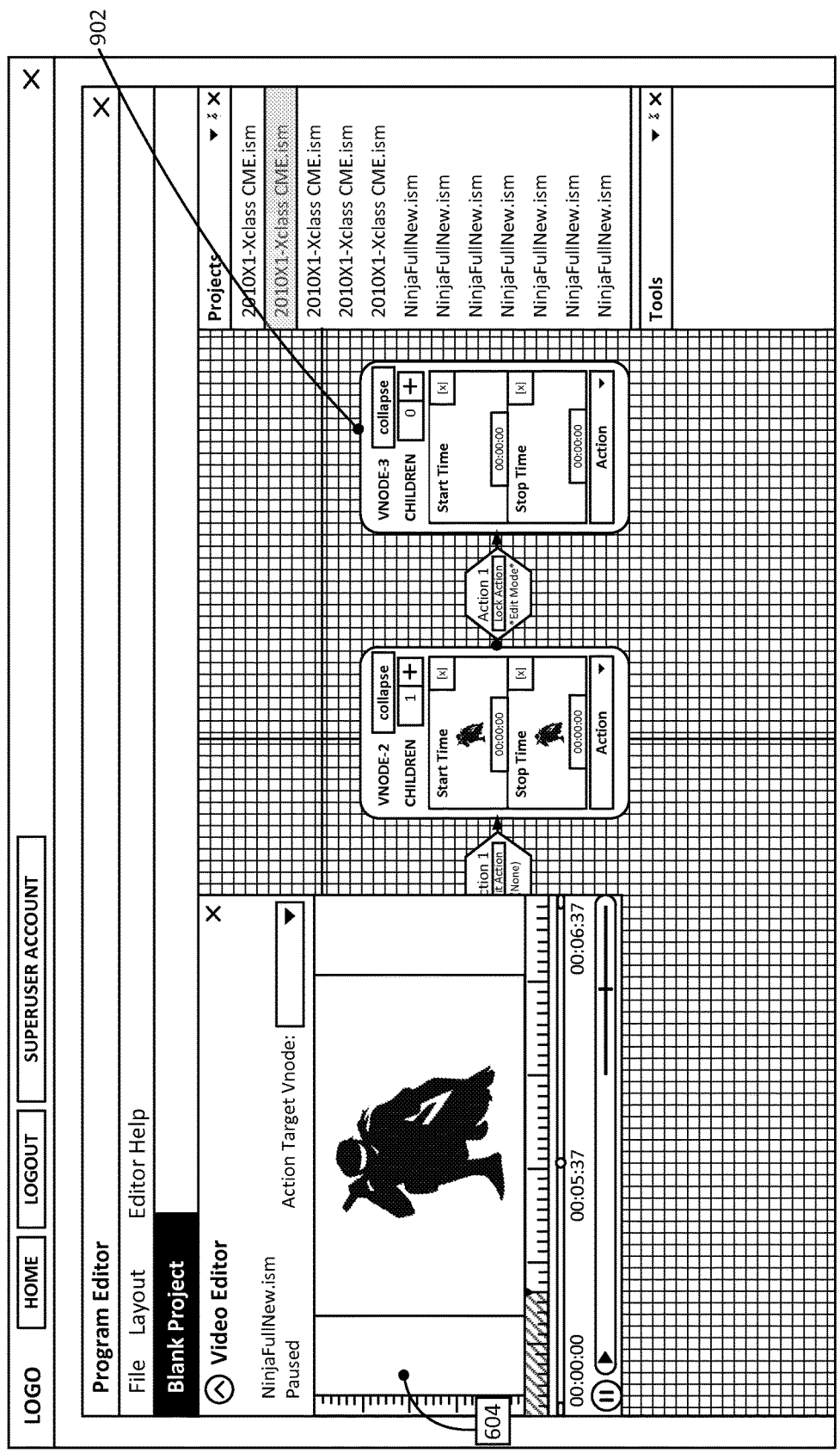
FIG. 9B illustrates an example screenshot of a user interface for creating/editing content, in accordance with some aspects of the disclosure.

Turing now to FIGS. 8A and 8B, as illustrated at 810, editing of the content frame representing the content can be locked once the user is satisfied with a selection. Once the content frame has been locked, a content engine core node 812 may be created wherein the user can select content frames to be produced (e.g., displayed). As illustrated in FIGS. 9A and 9B, after locking the start and stop times for a content engine core node 812, one or more additional nodes 902 can be created with an action identified between the nodes. Adding content engine core nodes can be used to define run-time nodes for, e.g., video segments. Moreover, as illustrated in FIGS. 9A and 9B, text can be associated with a particular portion of, e.g., a video. In some aspects, the text may be a hyperlink to a webpage providing more information about the selection.

Figure 10A:
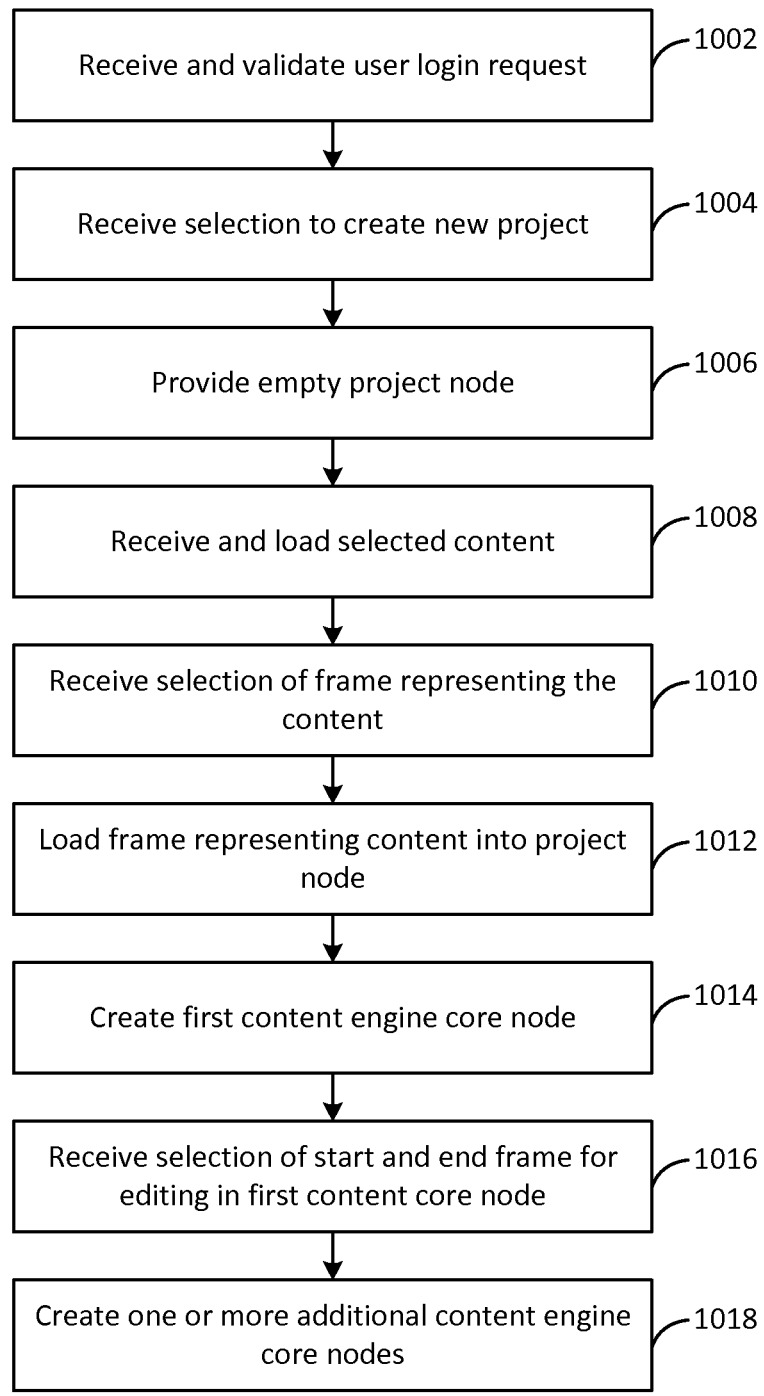
FIG. 10A illustrates a flowchart presenting an example of a method for providing interactive content, in accordance with some aspects of the disclosure.

FIG. 10A is a flowchart depicting an example of a method for providing interactive content. As seen at 1002, the method may begin when a user, such as a developer, logs into an application development environment, such as that illustrated in FIGS. 1 and 2. In response to validating the user's login credentials, a user may select an option to create a new project, as illustrated at 1004. The user may also be presented with options to edit or view an existing project. As illustrated at 1006, an empty project node may be provided and content may be uploaded to the content editing and presentation system. In some aspects, the system may provide a list of already uploaded content that the user can select from, and/or an option to upload new content.

In response to uploading/receiving a selection of content, the selected content may be loaded into a content player as well as the empty project node, as illustrated at 1008. For example, where the content is video, a video play may be loaded with the selected video. Initially, the video may be in the paused state in both the content player and the now-populated project node. As illustrated at 1010, a selection of a frame representing the content may be received. In some aspects, a scrub bar marker on the content player may be used to select the frame. As illustrated at 1012, the selected frame representing the content may be loaded into the project node, and the project node may be locked.

As illustrated at 1014, in response to receiving an option to lock the project node, a first content engine core node may be created. The content engine core node may be provided for selecting frames or portions of frames of the uploaded content for editing. Editing may include, for example, replacing the selected frames with other content such as, for example, other content frames such as video or audio frames, universal records locator (URL) test, HTML code, etc. As illustrated at 1016, the system may receive a start frame and an end frame for editing in the first content engine core. In some aspects, the start and end frames are selected using the scrub bar marker provided in the content player. As illustrated at 1018, a selection may be received to create another content engine core node for editing another portion of the uploaded content. In some aspects, multiple child content engine core nodes may be associated with a parent content engine core node, and options may be provided for indicating rules for selecting which node to play following a parent node.

Figure 10B:
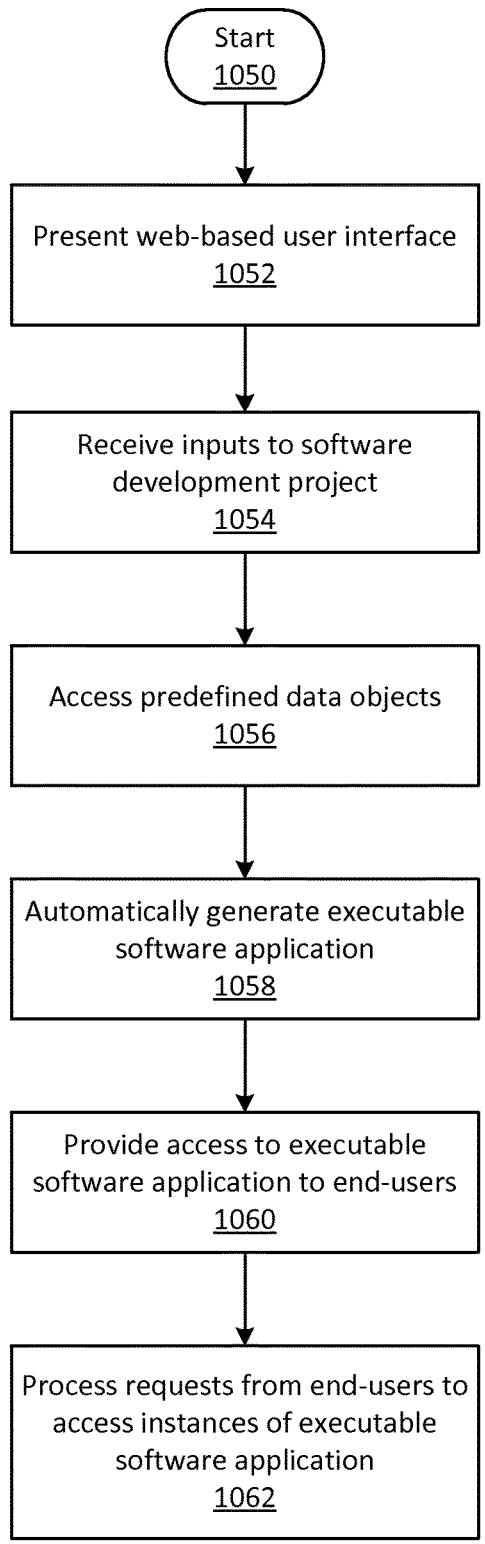
FIG. 10B illustrates an example of an operational procedure for developing and deploying software applications.

FIG. 10B illustrates an example of an operational procedure for developing and deploying software applications. In one embodiment, the operational procedure may be implemented in a virtualized computing environment hosted by a multi-user computing and network services platform. Referring to FIG. 10A, the operational procedure may include operations 1050, 1052, 1054, 1056, 1058, 1060, and 1062. Referring to FIG. 10A, operation 1050 begins the operational procedure. Operation 1050 may be followed by operation 1052. Operation 1052 illustrates presenting a web-based user interface. The web-based user interface may be presented to a developer user of the multi-user computing and network services platform. The web-based user interface may further provide options for accessing a software development project hosted by the multi-user computing and network services platform.

Operation 1052 may be followed by operation 1054. Operation 1054 illustrates receiving, by the multi-user web services platform via the user interface, inputs to the software development project. In one embodiment, the inputs may comprise data and/or a selection of a software component. The software component may be usable to form a software application. Operation 1054 may be followed by operation 1056. Operation 1056 illustrates accessing a plurality of predefined data objects available within the multi-user computing and network services platform. The predefined data objects may be usable to build the software application.

Operation 1056 may be followed by operation 1058. Operation 1058 illustrates automatically generating, using the plurality of predetermined data objects, an executable software application. The software application may be configured to execute on one or more virtual machine instances of the virtualized computing environment. The software application may also be accessible via the multi-user computing and network services platform to a plurality of end-users.

Operation 1058 may be followed by operation 1060. Operation 1060 illustrates providing, by the multi-user computing and network services platform, access to instances of the executable software application to the plurality of end-users. Operation 1060 may be followed by operation 1062. Operation 1062 illustrates processing a plurality of requests from the plurality of end-users to access the instances of the executable software application. The executable software application is developed within the multi-user computing and network services platform via the web-based user interface and is hosted by the multi-user computing and network services platform for use by end-users.

In some embodiments, a system may be implemented. The system may be configured to develop and deploy software applications in a virtualized computing environment hosted by a multi-user web services platform. The system may comprise a memory storing computer instructions that, when executed by one or more processors of the system, cause the system to implement a developer editor. The developer editor may be configured to present a web-based user interface providing options for accessing a software development project hosted by a multi-user web services platform. The developer editor may also be configured to receive inputs to the software development project. The inputs may comprise at least one of data and a selection of a software component usable to form a software application. The inputs may be received from a developer user of the multi-user web services platform.

The memory of the system may further comprise a computer instructions that, when executed by the processors of the system, cause the system to implement a developer editor. The development environment may be configured to access a plurality of predefined data objects available within the multi-user web services platform in response to receiving the inputs. The predefined data objects may be usable to build the software application. The development environment may be also configured to automatically generate, using the plurality of predetermined data objects, an executable software application. The executable software application may be configured to execute on one or more virtual machine instances of the virtualized computing environment. The executable software application may further be accessible via the multi-user web services platform to a plurality of end-users.

The memory of the system may further comprise a computer instructions that, when executed by the processors of the system, cause the system to implement an end-user client. The end-user client may be configured to provide access to instances of the executable software application to the plurality of end-users. The end-user client may further be configured to process a plurality of requests from the plurality of end-users to access the instances of the executable software application.

Figure 11:
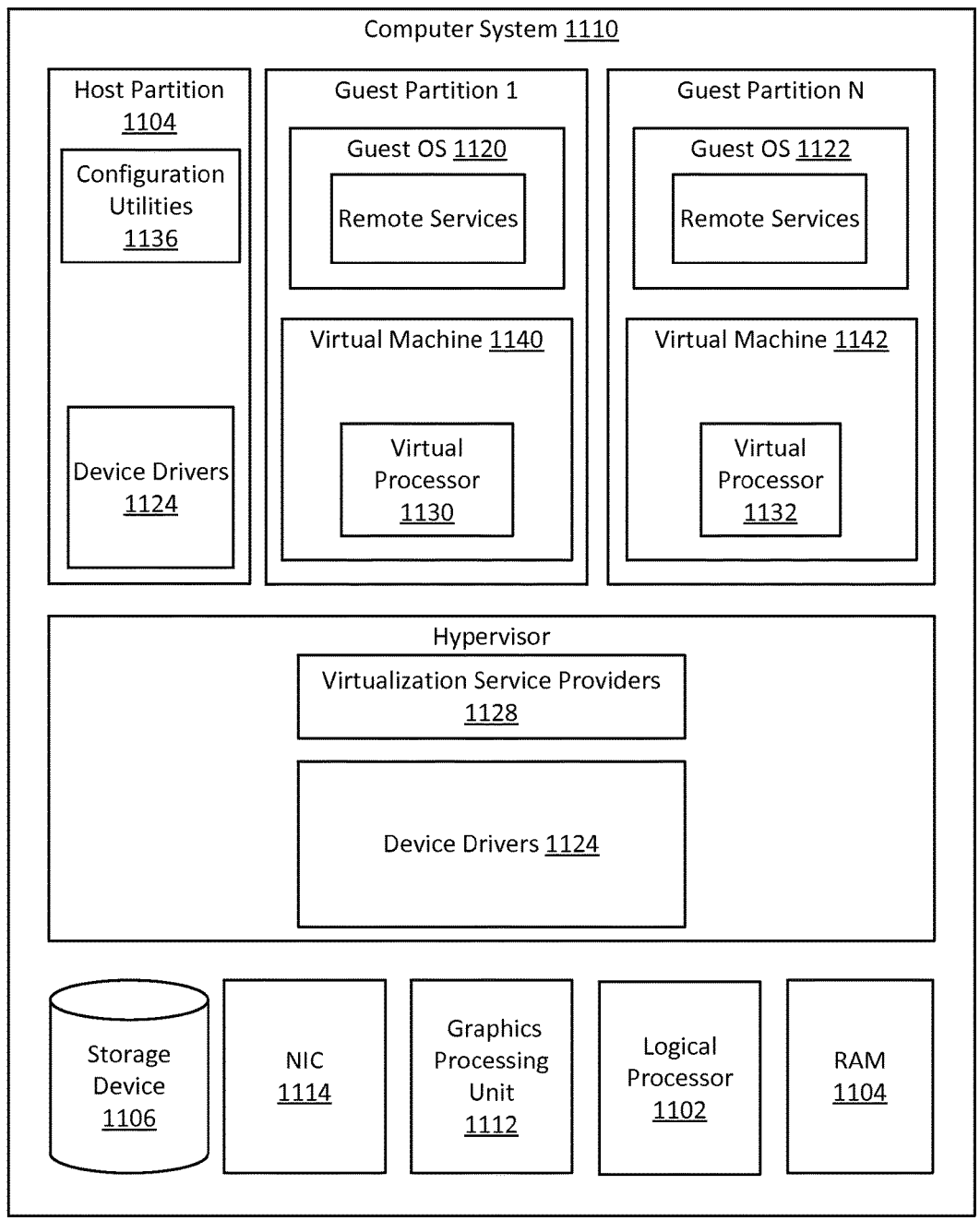
FIG. 11 depicts an example computing environment wherein aspects of the present disclosure can be implemented.

FIG. 11 depicts an example computing environment wherein aspects of the present disclosure can be implemented. In particular, FIG. 1 and the following description are intended to provide a brief, general description of an example virtual computing environment in which the embodiments described herein may be implemented. Referring to FIG. 1, a computer system 1100 includes a host partition 1104. Host partition 1104 can be configured to provide resources to guest operating systems executing in guest partitions 1 through N by using virtualization services. Each guest partition 1 through N can include one or more virtual processors such as virtual processors 1130 through 1132 that guest operating systems 1120 through 1122 can manage and schedule threads to execute thereon. Generally, virtual processors 1130 through 1132 may be executable instructions and associated state information that provide a representation of a physical processor with a specific architecture. For example, one virtual machine may have a virtual processor having characteristics of an Intel x86 processor, whereas another virtual processor may have the characteristics of a PowerPC processor. Virtual processors 1130 through 1132 in this example can be mapped to logical processor 1102 of computer system 1100 such that the instructions that effectuate virtual processors 1130 through 1132 are mapped to and/or executed by logical processor 1102. Thus, in these example embodiments, multiple virtual processors can be simultaneously executing while, for example, another logical processor is executing virtualization system instructions. Generally speaking, and as illustrated by the figure, the combination of virtual processors and memory in a partition can be considered a virtual machine such as virtual machine 1140 or 1142.

Generally, guest operating systems 1120 through 1122 can include any operating system such as, for example, operating systems from Microsoft®, Apple®, the open source community, etc. The guest operating systems can include user/kernel modes of operation and can have kernels that can include schedulers, memory managers, etc. A kernel mode can include an execution mode in a logical processor that grants access to privileged processor instructions. Each guest operating system 1120 through 1122 can have associated file systems that can have applications stored thereon such as terminal servers, e-commerce servers, email servers, etc., or the guest operating systems themselves. Guest operating systems 1120 through 1122 can schedule threads to execute on virtual processors 1130 through 1132 and instances of such applications can be effectuated.

Figure 12:
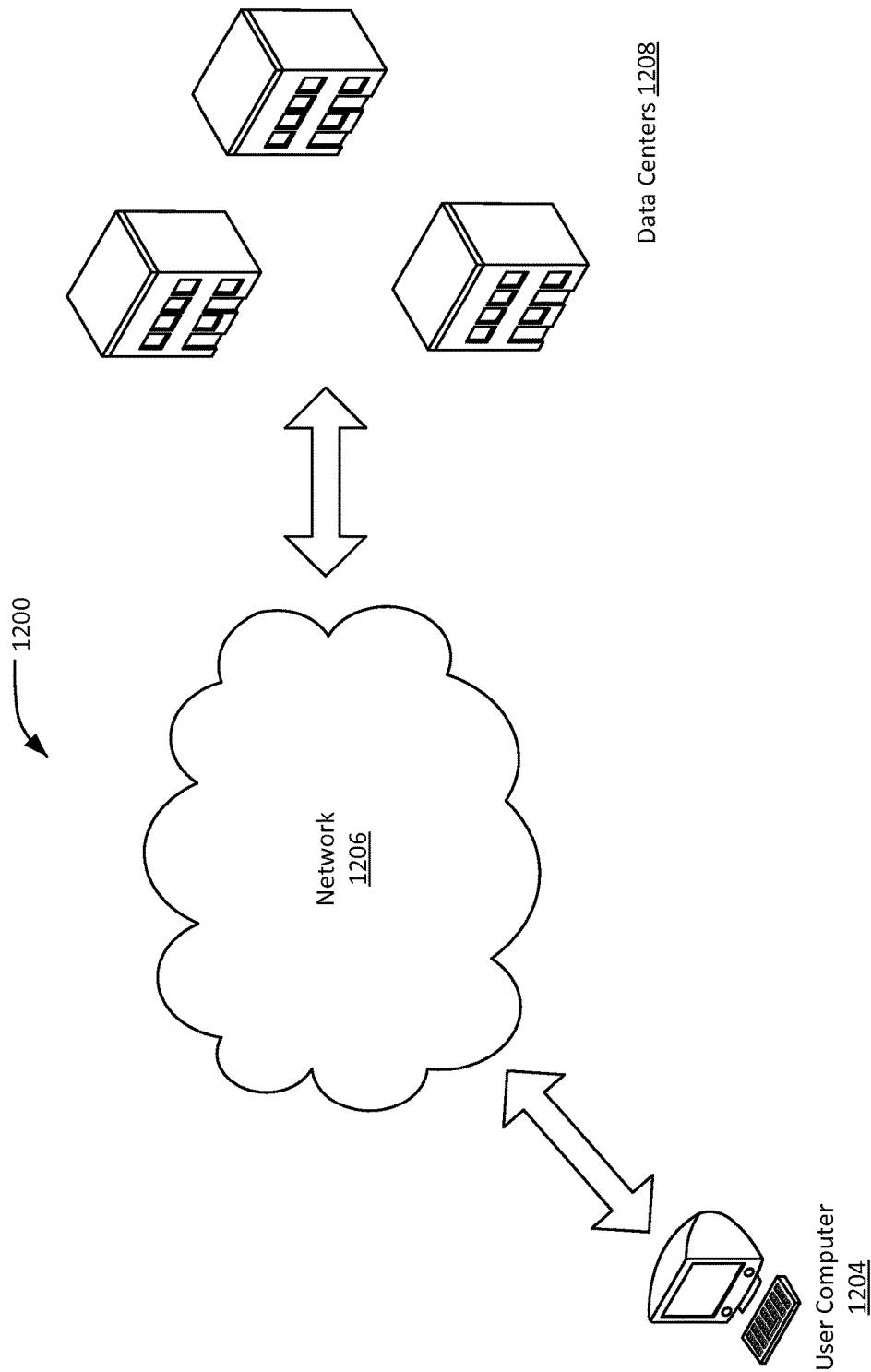
FIG. 12 depicts an example computing environment wherein aspects of the present disclosure can be implemented.

FIG. 12 depicts an example computing environment wherein aspects of the present disclosure can be implemented. In particular, FIG. 12 depicts an illustrative operating environment 1200 that includes data centers 1208 for providing computing resources. Data centers 1208 can provide computing resources for executing applications and providing data services on a continuous or an as-needed basis. The computing resources provided by data centers 1208 may include various types of resources, such as data processing resources, data storage resources, data communication resources, and the like. In some embodiments, the data processing resources may be available as virtual machine instances. The virtual machine instances may be configured to execute applications, including Web servers, application servers, media servers, database servers, and the like. Data storage resources may include file storage devices, block storage devices, and the like. The data center may include resources other than virtual machine computing resources, including a number of physical computing devices that can be configured to run one or more virtual machines that can be migrated across the physical resources for load balancing.

The computing resources provided by data centers 1208 may be enabled by one or more individual data centers. Data centers 1208 may be facilities utilized to house and operate computer systems and associated components. Data centers 1208 may include redundant and backup power, communications, cooling, and security systems. Data centers 1208 may also be located in geographically disparate locations.

The customers and other consumers of data centers 1208 may access the computing resources provided by data centers 1208 over a network 1206. It should be appreciated that a local-area network ("LAN"), the Internet, or any other networking topology known in the art that connects data centers 1208 to remote consumers may be utilized. It should also be appreciated that combinations of such networks might also be utilized.

A user computer 1204 may be a computer utilized by a customer or other consumer of data centers 1208. For instance, user computer 1204 may be a server computer, a desktop or laptop personal computer, a thin client, a tablet computer, a wireless telephone, a personal digital assistant ("PDA"), an e-reader, a game console, or any other computing device capable of accessing data centers 1208.

User computer 1204 may be utilized to configure aspects of the computing resources provided by data centers 1208 or access services provided by data centers 1208. For example, data centers 1208 may provide a Web interface through which aspects of its operation may be configured or accessed through the use of a Web browser application program executing on user computer 1204. Alternatively, a stand-alone application program executing on user computer 1204 might access an application programming interface (API) exposed by data centers 1208 for accessing the computing resources or performing the configuration operations. Other mechanisms for configuring the operation of data centers 1208, including deploying updates to an application or accessing the computing resources might also be utilized.

Figure 13:
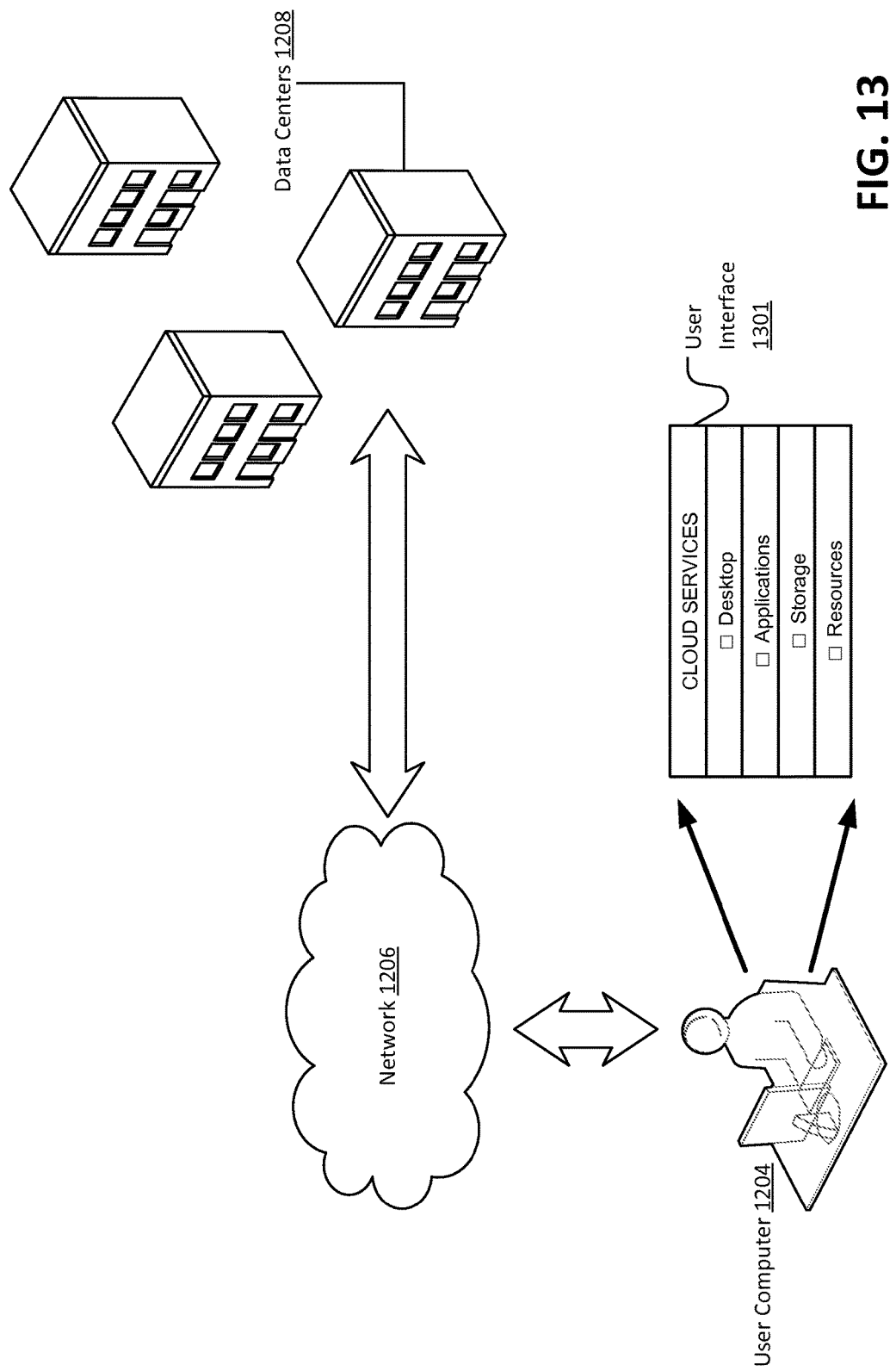
FIG. 13 depicts an example computing environment wherein aspects of the present disclosure can be implemented.

FIG. 13 depicts an example operational environment for practicing aspects of the present disclosure. In particular, FIG. 13 provides further detail to the example environment shown in FIG. 12. A user at user computer 1204 can access cloud computing services hosted in data centers 1208 via network 1206 and using a user interface 401. For example, user interface 1301 may comprise a web interface through which the cloud computing services can be accessed. The user may access services such as a remote desktop, applications, and storage services. The user may also access the user's company resources that are hosted by the cloud computing services. The provider of the cloud computing services can charge a fee to the user for providing the requested services. The cloud computing services may also be configured by an administrator that configures the cloud computing services to be provided to a defined group of users such as employees of a company that provides authentication credentials.

A "computer," as used in this disclosure, means any machine, device, circuit, component, or module, or any system of machines, devices, circuits, components, modules, or the like, which are capable of manipulating data according to one or more instructions, such as, for example, without limitation, a processor, a microprocessor, a central processing unit, a general purpose computer, a super computer, a personal computer, a laptop computer, a palmtop computer, a smart phone, a cellular telephone, a tablet, a web-book, a notebook computer, a desktop computer, a workstation computer, a server, a cloud, or the like, or an array of processors, microprocessors, central processing units, general purpose computers, super computers, personal computers, laptop computers, palmtop computers, notebook computers, desktop computers, workstation computers, servers, or the like.

A "network," as used in this disclosure, means any combination of software and/or hardware, including any machine, device, circuit, component, or module, or any system of machines, devices, circuits, components, modules, or the like, which are capable of transporting signals from one location to another location, where the signals may comprise information, instructions, data, and the like. A network may include, but is not limited to, for example, at least one of a local area network (LAN), a wide area network (WAN), a metropolitan area network (MAN), a personal area network (PAN), a campus area network, a corporate area network, a global area network (GAN), a broadband area network (BAN), or the like, any of which may be configured to communicate data via a wireless and/or a wired communication medium.

A "server," as used in this disclosure, means any combination of software and/or hardware, including at least one application and/or at least one computer to perform services for connected clients as part of a client-server architecture. The at least one server application may include, but is not limited to, for example, an application program that can accept connections to service requests from clients by sending back responses to the clients. The server may be configured to run the at least one application, often under heavy workloads, unattended, for extended periods of time with minimal human direction. The server may include a plurality of computers configured, with the at least one application being divided among the computers depending upon the workload. For example, under light loading, the at least one application can run on a single computer. However, under heavy loading, multiple computers may be required to run the at least one application. The server, or any of its computers, may also be used as a workstation.

A "communication link," as used in this disclosure, means a wired and/or wireless medium that conveys data or information between at least two points. The wired or wireless medium may include, for example, a metallic conductor link, a radio frequency (RF) communication link, an Infrared (IR) communication link, an optical communication link, or the like, without limitation. The RF communication link may include, for example, Wi-Fi, Wi-MAX, IEEE 802.11, DECT, 0G, 1G, 2G, 3G, or 4G cellular standards, Bluetooth®, and the like. One or more communication links may be used in an environment 100 (shown in FIG. 1) to allow sufficient data throughput and interaction between end-users (such as, e.g., agents, consumers, insurance carriers, estate planners, financial providers, web host providers, and the like). Techniques for implementing such communications links are known to those of ordinary skilled in the art.

Figure 14:
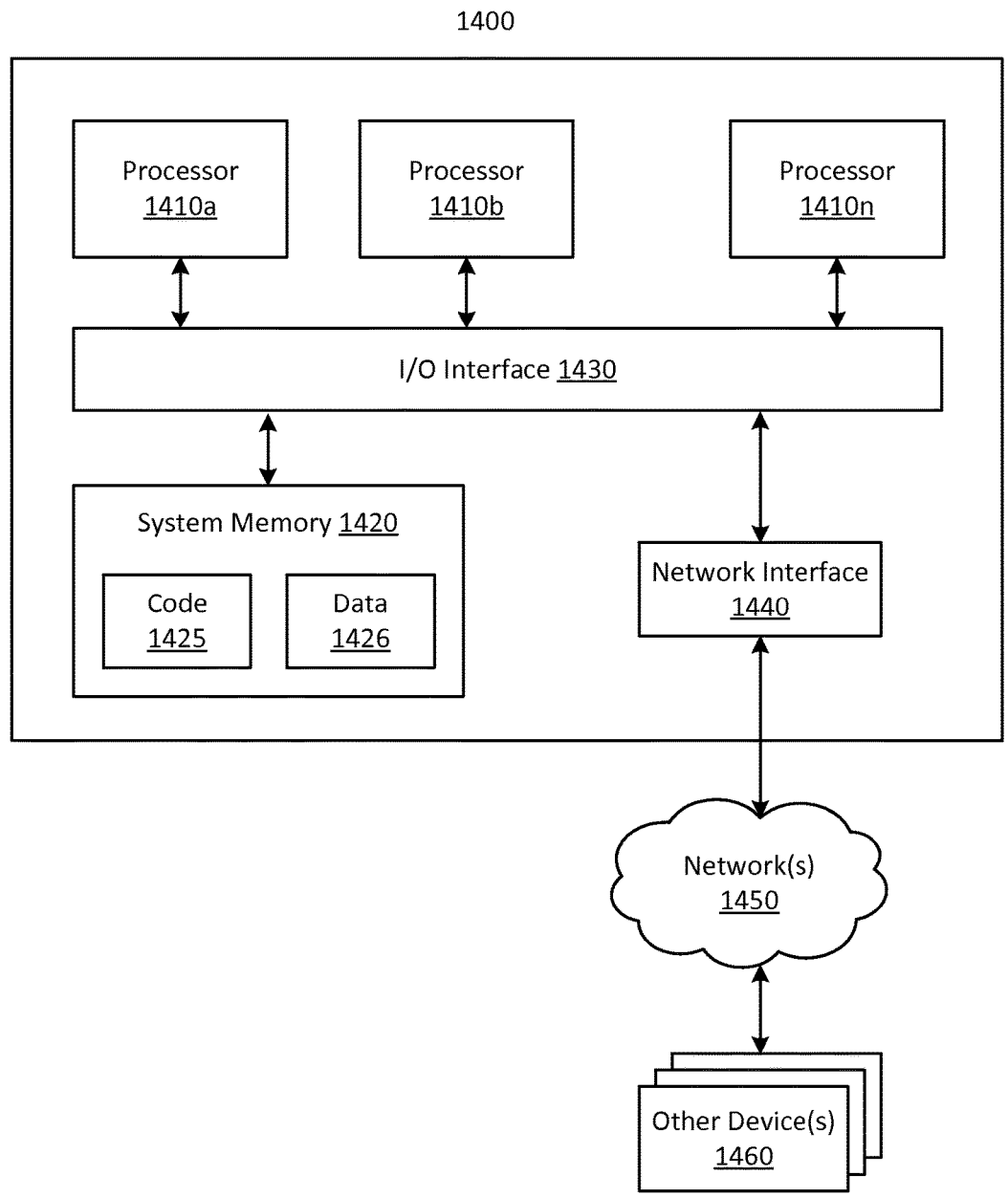
FIG. 14 depicts an example computing device wherein aspects of the present disclosure can be implemented.

In at least some embodiments, a computer that implements a portion or all of one or more of the technologies described herein may include a general purpose computer system that includes or is configured to access one or more computer-accessible media. FIG. 14 illustrates such a general purpose computing device 1400. In the illustrated embodiment, computing device 1400 includes one or more processors 1410*a*, 1410*b*, and/or 1410*n* (which may be referred herein singularly as "a processor 1410" or in the plural as "the processors 1410") coupled to a system memory 1420 via an input/output (I/O) interface 1430. Computing device 1400 further includes a network interface 1440 coupled to I/O interface 1430.

In various embodiments, computing device 1400 may be a uniprocessor system including one processor 1410 or a multiprocessor system including several processors 1410 (e.g., two, four, eight or another suitable number). Processors 1410 may be any suitable processors capable of executing instructions. For example, in various embodiments, processors 1410 may be general purpose or embedded processors implementing any of a variety of instruction set architectures (ISAs), such as the x86, PowerPC, SPARC, or MIPS ISAs or any other suitable ISA. In multiprocessor systems, each of processors 1410 may commonly, but not necessarily, implement the same ISA.

System memory 1420 may be configured to store instructions and data accessible by processor(s) 1410. In various embodiments, system memory 1420 may be implemented using any suitable memory technology, such as static random access memory (SRAM), synchronous dynamic RAM (SDRAM), nonvolatile/Flash-type memory or any other type of memory. In the illustrated embodiment, program instructions and data implementing one or more desired functions, such as those methods, techniques and data described above, are shown stored within system memory 1420 as code 1425 and data 1426.

In one embodiment, I/O interface 1430 may be configured to coordinate I/O traffic between processor 1410, system memory 1420 and any peripheral devices in the device, including network interface 1440 or other peripheral interfaces. In some embodiments, I/O interface 1430 may perform any necessary protocol, timing or other data transformations to convert data signals from one component (e.g., system memory 1420) into a format suitable for use by another component (e.g., processor 1410). In some embodiments, I/O interface 1430 may include support for devices attached through various types of peripheral buses, such as a variant of the Peripheral Component Interconnect (PCI) bus standard or the Universal Serial Bus (USB) standard, for example. In some embodiments, the function of I/O interface 1430 may be split into two or more separate components, such as a north bridge and a south bridge, for example. Also, in some embodiments some or all of the functionality of I/O interface 1430, such as an interface to system memory 1420, may be incorporated directly into processor 1410.

Network interface 1440 may be configured to allow data to be exchanged between computing device 1400 and other device or devices 1460 attached to a network or networks 1450, such as other computer systems or devices as illustrated in FIGS. 1 through 14, for example. In various embodiments, network interface 1440 may support communication via any suitable wired or wireless general data networks, such as types of Ethernet networks, for example. Additionally, network interface 1440 may support communication via telecommunications/telephony networks such as analog voice networks or digital fiber communications networks, via storage area networks, such as Fibre Channel SANs, or via any other suitable type of network and/or protocol.

In some embodiments, system memory 1420 may be one embodiment of a computer-accessible medium configured to store program instructions and data as described above for FIGS. 1-10B for implementing embodiments of the corresponding methods and apparatus. However, in other embodiments, program instructions and/or data may be received, sent or stored upon different types of computer-accessible media. Generally speaking, a computer-accessible medium may include non-transitory storage media or memory media, such as magnetic or optical media, e.g., disk or DVD/CD coupled to computing device 1400 via I/O interface 1430. A non-transitory computer-accessible storage medium may also include any volatile or non-volatile media such as RAM (e.g., SDRAM, DDR SDRAM, RDRAM, SRAM, etc.), ROM, etc., that may be included in some embodiments of computing device 1400 as system memory 1420 or another type of memory. Further, a computer-accessible medium may include transmission media or signals such as electrical, electromagnetic or digital signals, conveyed via a communication medium such as a network and/or a wireless link, such as may be implemented via network interface 1440. Portions or all of multiple computing devices, such as those illustrated in FIG. 14, may be used to implement the described functionality in various embodiments; for example, software components running on a variety of different devices and servers may collaborate to provide the functionality. In some embodiments, portions of the described functionality may be implemented using storage devices, network devices or special purpose computer systems, in addition to or instead of being implemented using general purpose computer systems. The term "computing device," as used herein, refers to at least all these types of devices and is not limited to these types of devices.

A network set up by an entity, such as a company or a public sector organization, to provide one or more services (such as various types of cloud-based computing or storage) accessible via the Internet and/or other networks to a distributed set of clients may be termed a provider network. Such a provider network may include numerous data centers hosting various resource pools, such as collections of physical and/or virtualized computer servers, storage devices, networking equipment and the like, needed to implement and distribute the infrastructure and services offered by the provider network. The resources may in some embodiments be offered to clients in units called instances, such as virtual or physical computing instances or storage instances. A virtual computing instance may, for example, comprise one or more servers with a specified computational capacity (which may be specified by indicating the type and number of CPUs, the main memory size, and so on) and a specified software stack (e.g., a particular version of an operating system, which may in turn run on top of a hypervisor).

A number of different types of computing devices may be used singly or in combination to implement the resources of the provider network in different embodiments, including general purpose or special purpose computer servers, storage devices, network devices and the like. In some embodiments a client or user may be provided direct access to a resource instance, e.g., by giving a user an administrator login and password. In other embodiments the provider network operator may allow clients to specify execution requirements for specified client applications and schedule execution of the applications on behalf of the client on execution platforms (such as application server instances, Java™ virtual machines (JVMs), general purpose or special purpose operating systems, platforms that support various interpreted or compiled programming languages such as Ruby, Perl, Python, C, C++, and the like, or high-performance computing platforms) suitable for the applications, without, for example, requiring the client to access an instance or an execution platform directly. A given execution platform may utilize one or more resource instances in some implementations; in other implementations multiple execution platforms may be mapped to a single resource instance.

The terms "including," "comprising," "having," and variations thereof, as used in this disclosure, mean "including, but not limited to," unless expressly specified otherwise.

The terms "a," "an," and "the," as used in this disclosure, means "one or more," unless expressly specified otherwise.

Devices that are in communication with each other need not be in continuous communication with each other, unless expressly specified otherwise. In addition, devices that are in communication with each other may communicate directly or indirectly through one or more intermediaries.

Although process steps, method steps, algorithms, or the like may be described in a sequential order, such processes, methods and algorithms may be configured to work in alternate orders. In other words, any sequence or order of steps that may be described does not necessarily indicate a requirement that the steps be performed in that order. The steps of the processes, methods or algorithms described herein may be performed in any order practical. Further, some steps may be performed simultaneously.

When a single device or article is described herein, it will be readily apparent that more than one device or article may be used in place of a single device or article. Similarly, where more than one device or article is described herein, it will be readily apparent that a single device or article may be used in place of the more than one device or article. The functionality or the features of a device may be alternatively embodied by one or more other devices which are not explicitly described as having such functionality or features.

A "computer-readable medium," as used in this disclosure, means any medium that participates in providing data (for example, instructions) which may be read by a computer. Such a medium may take many forms, including non-volatile media, volatile media, and transmission media. Non-volatile media may include, for example, optical or magnetic disks and other persistent memory. Volatile media may include dynamic random access memory (DRAM). Transmission media may include coaxial cables, copper wire and fiber optics, including the wires that comprise a system bus coupled to the processor. Transmission media may include or convey acoustic waves, light waves and electromagnetic emissions, such as those generated during radio frequency (RF) and infrared (IR) data communications. Common forms of computer-readable media include, for example, a floppy disk, a flexible disk, hard disk, magnetic tape, any other magnetic medium, a CD-ROM, DVD, any other optical medium, punch cards, paper tape, any other physical medium with patterns of holes, a RAM, a PROM, an EPROM, a FLASH-EEPROM, any other memory chip or cartridge, a carrier wave as described hereinafter, or any other medium from which a computer can read.

Various forms of computer-readable media may be involved in carrying sequences of instructions to a computer. For example, sequences of instruction (i) may be delivered from a RAM to a processor, (ii) may be carried over a wireless transmission medium, and/or (iii) may be formatted according to numerous formats, standards or protocols, including, for example, Wi-Fi, Wi-MAX, IEEE 802.11, DECT, OG, IG, 2G, 3G, or 4G cellular standards, Bluetooth®, or the like.

The present disclosure is not to be limited in terms of the particular embodiments described in this application, which are intended as illustrations of various aspects. Many modifications and variations can be made without departing from its spirit and scope, as will be apparent to those skilled in the art. Functionally equivalent methods and apparatuses within the scope of the disclosure, in addition to those enumerated herein, will be apparent to those skilled in the art from the foregoing descriptions. Such modifications and variations are intended to fall within the scope of the appended claims. The present disclosure is to be limited only by the terms of the appended claims, along with the full scope of equivalents to which such claims are entitled. It is to be understood that this disclosure is not limited to particular methods, reagents, compounds, compositions or biological systems, which can, of course, vary. It is also to be understood that the terminology used herein is for the purpose of describing particular embodiments only, and is not intended to be limiting.

There is little distinction left between hardware and software implementations of aspects of systems; the use of hardware or software is generally (but not always, in that in certain contexts the choice between hardware and software can become significant) a design choice representing cost vs. efficiency tradeoffs. There are various vehicles by which processes and/or systems and/or other technologies described herein can be effected (e.g., hardware, software, and/or firmware), and that the preferred vehicle will vary with the context in which the processes and/or systems and/or other technologies are deployed. For example, if an implementer determines that speed and accuracy are paramount, the implementer may opt for a mainly hardware and/or firmware vehicle; if flexibility is paramount, the implementer may opt for a mainly software implementation; or, yet again alternatively, the implementer may opt for some combination of hardware, software, and/or firmware.

One skilled in the art will appreciate that, for this and other processes and methods disclosed herein, the functions performed in the processes and methods may be implemented in differing order. Furthermore, the outlined steps and operations are only provided as examples, and some of the steps and operations may be optional, combined into fewer steps and operations, or expanded into additional steps and operations without detracting from the essence of the disclosed embodiments.

While the invention has been described in terms of exemplary embodiments, those skilled in the art will recognize that the invention can be practiced with modifications in the spirit and scope of the appended claims. These examples given above are merely illustrative and are not meant to be an exhaustive list of all possible designs, embodiments, applications or modifications of the invention.

What is claimed:

1. A computer-implemented method for developing and deploying digital content in a virtualized computing environment hosted by a multi-user computing and network services platform, the method comprising:
    generating data usable to render a user interface providing one or more options for accessing or initiating a digital content development project;
    receiving, by the multi-user computing and network services platform, inputs to the digital content development project, wherein the inputs comprise at least one of data or a selection of a component usable to generate the digital content;
    in response to receiving the inputs, accessing a plurality of predefined data objects available within the multi-user computing and network services platform and usable to build the digital content;
    automatically generating, using the plurality of predefined data objects, the digital content, wherein the digital content is to be instantiated on one or more virtual machines of the virtualized computing environment and accessible via the multi-user computing and network services platform to a plurality of end-users;
    providing, by the multi-user computing and network services platform, access to instances of the digital content to the plurality of end-users, the instances of the digital content instantiated on the one or more virtual machines of the virtualized computing environment; and
    processing a plurality of requests from the plurality of end-users to access the instances of the digital content, the instances of the digital content instantiated on the one or more virtual machines of the virtualized computing environment;
    wherein the digital content is developed and deployed within the multi-user computing and network services platform via the user interface and is hosted by the multi-user computing and network services platform via the one or more virtual machines of the virtualized computing environment for use access by end-users.

2. The method of claim 1, wherein the predefined data objects include one or more of a video file, an audio, or an application.

3. The method of claim 1, wherein the inputs to the digital content development project are received via a user interface component that provides a visual editing interface control operative to facilitate construction of application data, logic, or editing tasks.

4. The method of claim 3, wherein the user interface component further comprises a developer component operative to provide an interface for developer devices to create interactive content.

5. The method of claim 3, wherein the user interface component further comprises a sponsor component that provides a visual editing interface control for receiving inputs from sponsors.

6. The method of claim 3, wherein the user interface component further comprises a project visual editor that facilitates the construction of application data, logic, and programming or editing tasks.

7. The method of claim 6, wherein the project visual editor further comprises
action objects usable to define a cloud application or to define digital assets created by the cloud application.

8. The method of claim 7, wherein the action objects comprise digital objects that contain programming logic or data that define a behavior and are operable to invoke other action objects or communicate to an application cluster.

9. The method of claim 1, further comprising publishing application data comprising compacted and compiled digital assets previously received by the user interface.

10. The method of claim 9, wherein the published application data is accessible by the end-users via a developer-defined client interface.

11. A system develops and deploys digital content in a virtualized computing environment hosted by a multi-user computing and network services platform, the system comprising at least one memory having stored therein computer instructions that, upon execution by one or more processors of the system, at least cause the system to implement:
a developer editor to:
present a user interface providing one or more options for accessing or initiating a digital content development project; and
receive inputs to the digital content development project, wherein the inputs comprise at least one of data or a selection of a component usable to generate the digital content;
a development environment to:
in response to receiving the inputs, access a plurality of predefined data objects available within the multi-user computing and network services platform and usable to build the digital content; and
automatically generate, using the plurality of predefined data objects, the digital content, the digital content to be instantiated on one or more virtual machines of the virtualized computing environment and accessible via the multi-user computing and network services platform to a plurality of end-users; and
an end-user client to:
provide access to instances of the digital content to the plurality of end-users, the instances of the digital content instantiated on the one or more virtual machines of the virtualized computing environment; and
process a plurality of requests from the plurality of end-users to access the instances of the digital content, the instances of the digital content instantiated on the one or more virtual machines of the virtualized computing environment.

12. The system of claim 11, further comprising a publishing component to publish content in selectable digital formats.

13. The system of claim 11, further comprising a project visual editor that receives to receive inputs pertaining to construction of application data, logic, and programming or editing tasks.

14. The system of claim 11, further comprising a cloud application input/output client comprising a set of predefined digital assets operative to define how data used by the digital content is interacted with by the end-user.

15. The system of claim 11, further comprising a client action tracking system to facilitate that facilitates tracking of user interactions with content provided by a client interface.

16. The system of claim 15, wherein the client action tracking system comprises a client action tracker configured by inputs received from a project sponsor interface.

17. The system of claim 11, further comprising a user interface component to provide that provides a visual editing interface control.

18. The system of claim 11, further comprising a sponsor component to provide that provides a visual editing interface control for sponsor input.

19. The system of claim 11, further comprising software libraries and developer tools.

20. A system for developing and deploying digital content in a virtualized computing environment hosted by a multi-user computing and network services platform, the system comprising:
a processor and a memory communicatively coupled with the processor;
means for providing renderable data for display to a developer user of the multi-user computing and network services platform, the display for a user interface providing one or more options for accessing a digital content development project;
means for receiving inputs to the digital content development project, wherein the inputs comprise at least one of data or a selection of a component usable to form the digital content;
means for accessing a plurality of predefined data objects available within the multi-user computing and network services platform and usable to build the digital content;
means for generating, using the plurality of predefined data objects, the digital content, wherein the digital content is to be instantiated on one or more virtual machines instances of the virtualized computing environment and accessible via the multi-user computing and network services platform to a plurality of end-users;
means for providing access to instances of the digital content to the plurality of end-users, the instances of the digital content instantiated on the one or more virtual machines of the virtualized computing environment; and
means for processing a plurality of requests from the plurality of end-users to access the instances of the digital content, the instances of the digital content instantiated on the one or more virtual machines of the virtualized computing environment;
wherein the digital content is developed and deployed within the multi-user computing and network services platform via the user interface and is hosted by the multi-user computing and network services platform via the one or more virtual machines of the virtualized computing environment for use by end-users.

* * * * *

UNITED STATES PATENT AND TRADEMARK OFFICE
CERTIFICATE OF CORRECTION

PATENT NO. : 9,971,593 B2  
APPLICATION NO. : 14/850841  
DATED : May 15, 2018  
INVENTOR(S) : Noel Shepard Stephens and Robert John Erwin It is certified that error appears in the above-identified patent and that said Letters Patent is hereby corrected as shown below:

Column 20  
Claim 13, Line 2: Remove "to receive"  
Claim 15, Line 2: Remove "to facilitate"  
Claim 17, Line 2: Remove "to provide"  
Claim 18, Line 2: Remove "to provide"

Signed and Sealed this  
Twenty-first Day of August, 2018

Andrei Iancu  
*Director of the United States Patent and Trademark Office*